(12) United States Patent
Yu et al.

(10) Patent No.: US 12,490,190 B2
(45) Date of Patent: Dec. 2, 2025

(54) METHOD AND FRAME STRUCTURE FOR ULTRA-LOW POWER RECEIVERS BASED ON IEEE 802.11AH

(71) Applicant: NEWRACOM, Inc., Lake Forest, CA (US)

(72) Inventors: Heejung Yu, Daejeon (KR); Duk Bai Kim, Irvine, CA (US)

(73) Assignees: NEWRACOM, Inc., Irvine, CA (US); NEWRATEK, Inc., Seoul (KR)

( * ) Notice: Subject to any disclaimer, the term of this patent is extended or adjusted under 35 U.S.C. 154(b) by 861 days.

(21) Appl. No.: 17/804,285

(22) Filed: May 26, 2022

(65) Prior Publication Data

US 2022/0386238 A1 Dec. 1, 2022

Related U.S. Application Data

(60) Provisional application No. 63/269,088, filed on Mar. 9, 2022, provisional application No. 63/194,783, filed on May 28, 2021.

(51) Int. Cl.
*H04W 52/02* (2009.01)
*H04W 84/12* (2009.01)

(52) U.S. Cl.
CPC ... *H04W 52/0229* (2013.01); *H04W 52/0219* (2013.01); *H04W 84/12* (2013.01)

(58) Field of Classification Search
CPC ......... H04W 52/0229; H04W 52/0219; H04W 84/12
See application file for complete search history.

(56) References Cited

U.S. PATENT DOCUMENTS

| 10,531,389 B2 * | 1/2020 | Min ..................... H04W 76/27 |
| 2019/0208470 A1 * | 7/2019 | Asterjadhi ........ H04W 52/0229 |
| 2020/0328863 A1 * | 10/2020 | Jia ..................... H04W 52/0274 |

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.

IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.

(Continued)

*Primary Examiner* — Gbemileke J Onamuti
(74) *Attorney, Agent, or Firm* — Nicholson, De Vos, Webster & Elliott, LLP; Daniel J. Lee

(57) ABSTRACT

A method performed by a wireless device operating in a wireless network, wherein the wireless device includes a main radio and a wake-up receiver. The method includes detecting, by a first component of the wake-up receiver, a wake-up receiver preamble in a wireless transmission received by the wireless device and waking up a second component of the wake-up receiver in response to detecting the wake-up receiver preamble.

20 Claims, 28 Drawing Sheets

(56) References Cited

OTHER PUBLICATIONS

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.
IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunications and information exchange between systems, Local and metropolitan area networks—Specific requirements, Dec. 18, 2013, 425 pages.
IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, Dec. 7, 2016, 594 pages.
IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.
IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE_802_11ba-2021, "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications, Amendment 3: Wake-Up Radio Operation, Mar. 25, 2021, 180 pages.
IEEE_802_11p-2010, "IEEE Standard for Information technology—Telecommuications and information exchange between systems—Local and metropolitan area networks—Specific Requirments", Part 11: Wireless LAN Medium Access Control (MAC) and Physical Layer (PHY) Specifications, Amendment 6: Wireless Access in Vehicular Environments, Jul. 15, 2010, 51 pages.

\* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

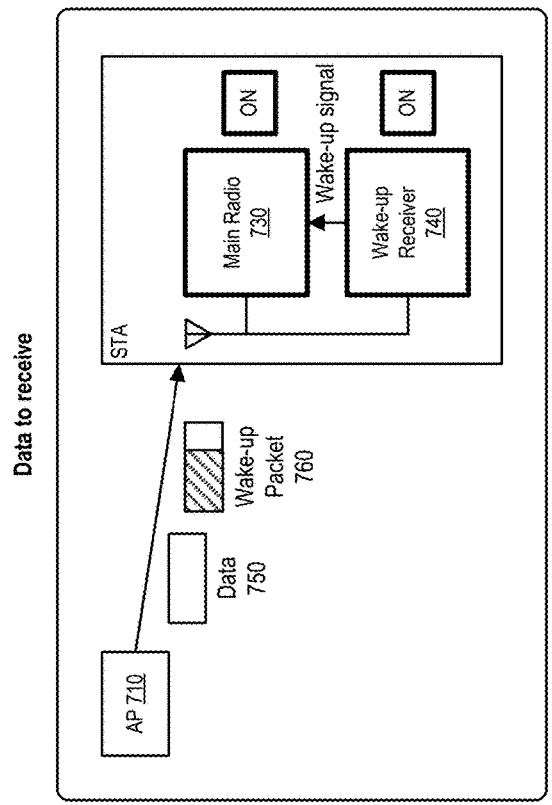
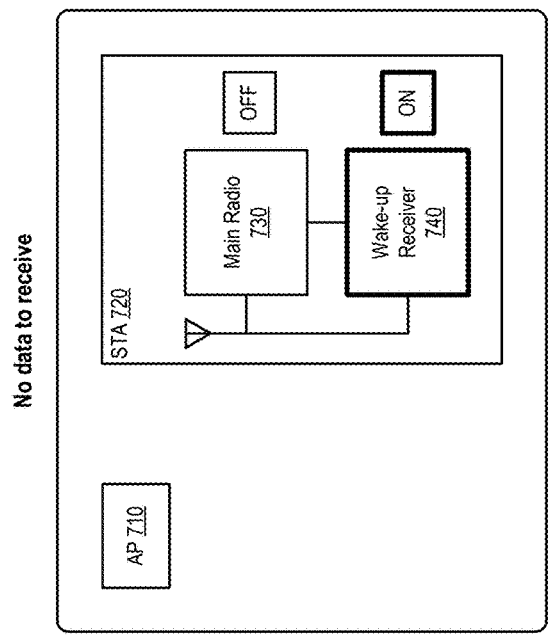
FIG. 7
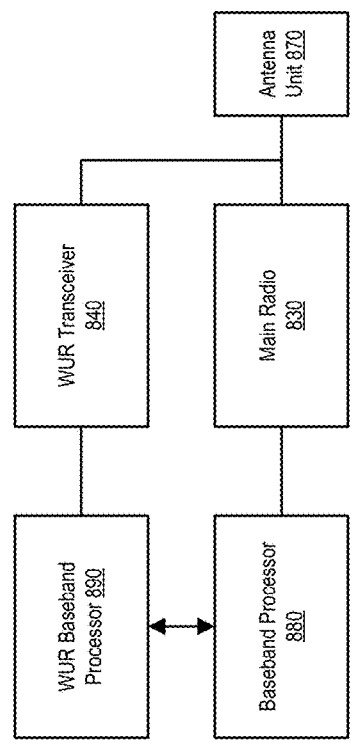
FIG. 8

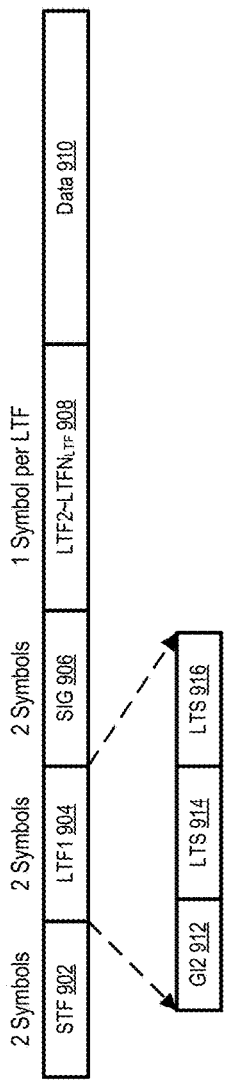
FIG. 9 S1G1_SHORT PPDU format
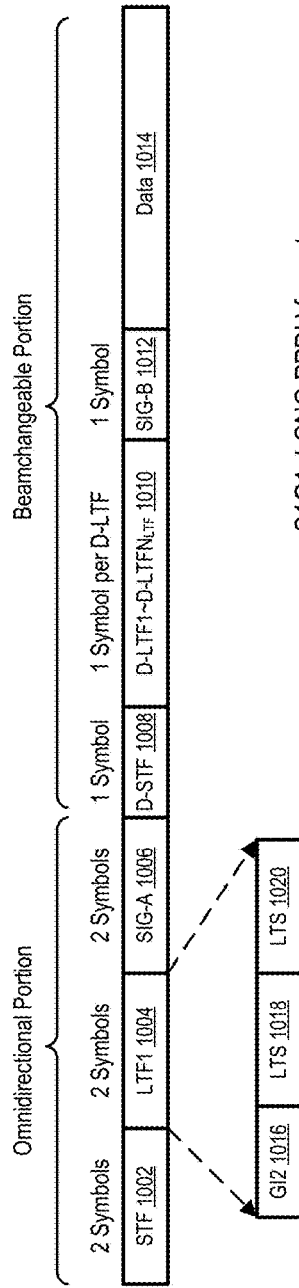
FIG. 10 S1G1_LONG PPDU format
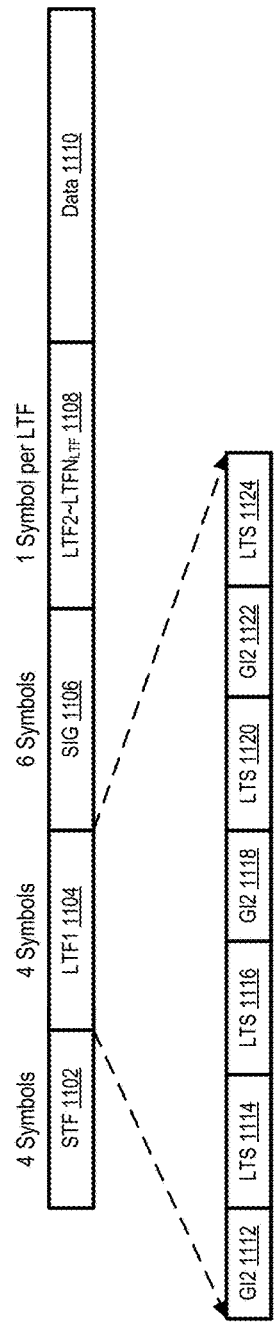
FIG. 11 S1G1_1M PPDU format

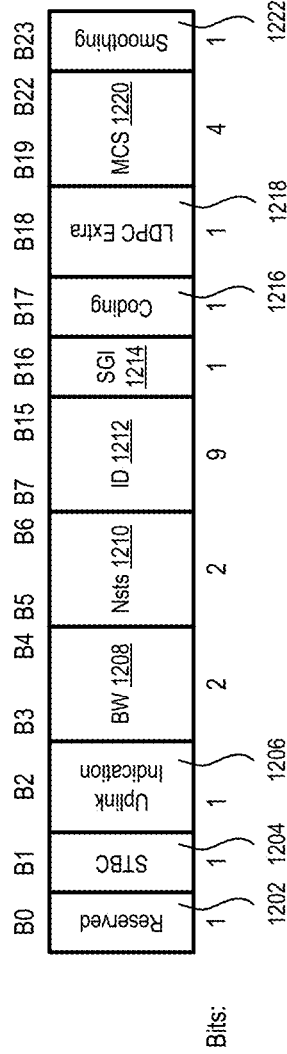
FIG. 12A  SIG-1 field format for S1G_SHORT PPDU
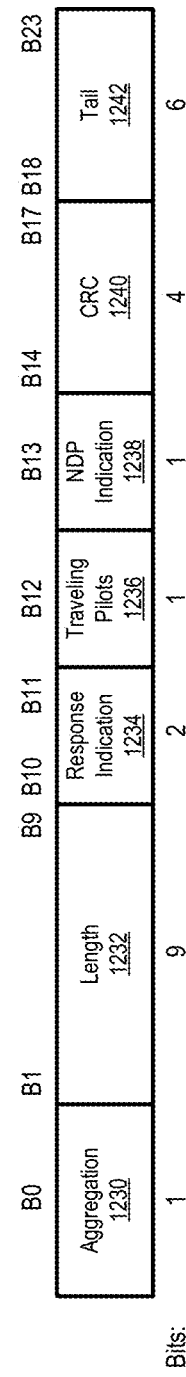
FIG. 12B  SIG-2 field format for S1G_SHORT PPDU

FIG. 13A SIG-A-1 field format for S1G_LONG SU PPDU

| B0 | B1 | B2 | B3 B4 | B5 B6 B7 B8 B9 B10 B11 B12 B13 B14 B15 | B16 | B17 | B18 B19 B20 B21 B22 | B23 |
|---|---|---|---|---|---|---|---|---|
| MU/SU | STBC | Uplink Indication | BW 1308 | Nsts 1310 | ID 1312 | SGI 1314 | Coding 1316 | LDPC Extra 1318 | MCS 1320 | Beam-change/ Smoothing Indication 1322 |
| 1 | 1 | 1 | 2 | 2 | 9 | 1 | 1 | 1 | 4 | 1 |

Bits: 1302 1304 1306

FIG. 13B SIG-A-2 field format for S1G_LONG SU PPDU

| B0 | B1 B2 ... B8 | B9 B10 | B11 B12 | B13 B14 | B15 B16 | B17 B18 ... B23 |
|---|---|---|---|---|---|---|
| Aggregation 1330 | Length 1332 | Response Indication 1334 | Reserved | Traveling Pilots | CRC 1340 | Tail 1342 |
| 1 | 9 | 2 | 1 | 1 | 4 | 6 |

Bits: 1336 1338

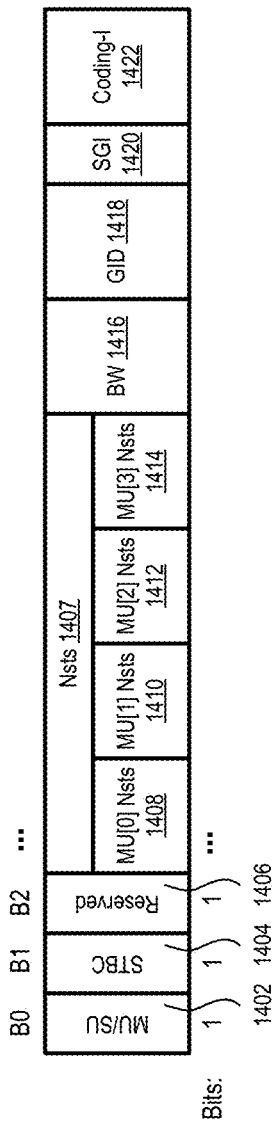
FIG. 14A  SIG-A-1 field format for S1G_LONG MU PPDU
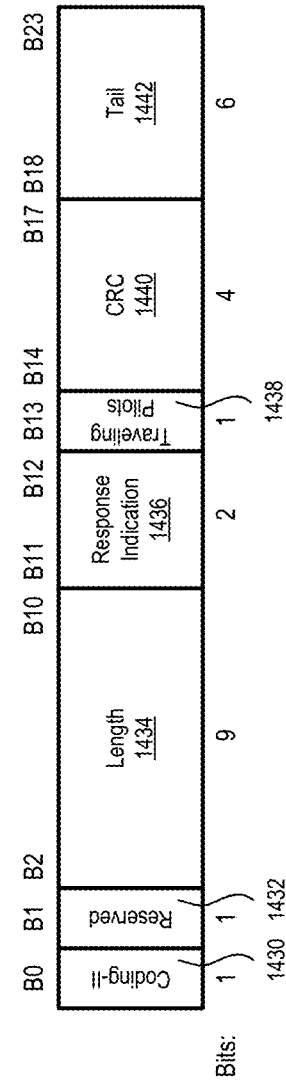
FIG. 14B  SIG-A-2 field format for S1G_LONG MU PPDU

| Type | Type Description |
|---|---|
| 0 | WUR Beacon |
| 1 | WUR Wake-up |
| 2 | WUR Vendor Specific |
| 3 | WUR Discovery |
| 4 | WUR Short Wake-up |
| 5-7 | Reserved |

FIG. 25

| ID Field | Identifier Description |
|---|---|
| Transmitter ID | Identifier of transmitting AP |
| Nontransmitter ID | Identifier of the nontransmitted BSSID |
| WUR Group ID | Identifier of a group of receiving WUR non-AP STAs |
| WUR ID | Identifier of an individual receiving WUR non-AP STA |
| OUI1 | The 12 LSBs of the OUI (Organization Identifier field) |

FIG. 26

| Port Name | Type | Description |
|---|---|---|
| data[7:0] | Input | 8 bit data input |
| addr[5:0] | Input | 6 bit address input |
| we | Input | Write enable input |
| clk | Input | Clock input |
| q[7:0] | Output | 8 bit data output |
| sel | Input | Selection between ROM and RAM |
| out | Output | Final output |

METHOD AND FRAME STRUCTURE FOR ULTRA-LOW POWER RECEIVERS BASED ON IEEE 802.11AH

CROSS-REFERENCE TO RELATED APPLICATION

This application claims the benefit of U.S. Provisional Application No. 63/194,783, filed May 28, 2021, titled, "METHOD AND FRAME STRUCTURE FOR ULTRA-LOW POWER RECEIVERS BASED ON IEEE 802.11AH" and U.S. Provisional Application No. 63/269,088, filed Mar. 9, 2022, titled, "METHOD AND PROGRAMMABLE STRUCTURE OF PREAMBLE SEQUENCES FOR ULTRA-LOW POWER RECEIVERS BASED ON IEEE 802.11AH," which are hereby incorporated by reference.

TECHNICAL FIELD

The present disclosure generally relates to wireless communications, and more specifically, relates to reducing power consumption in a wireless network.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

The IEEE 802.11ah standard offers various low power features. However, they are not adequate in some application that require ultra-low power consumption as well as low latency time at the same time during the power save mode.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 7 is a diagram showing operational examples of a low-power wake-up receiver when there is data to receive and when there is no data to receive, according to some embodiments.

FIG. 8 is a diagram showing components of an 802.11ah STA that supports wake-up receiver operations, according to some embodiments.

FIG. 9 is a diagram showing a S1G_SHORT physical layer protocol data unit (PPDU) format, according to some embodiments.

FIG. 10 is a diagram showing a S1G_LONG PPDU format, according to some embodiments.

FIG. 11 a diagram showing a S1G_1M PPDU format, according to some embodiments.

FIG. 12A is a diagram showing a SIG-1 field format for an Institute of Electrical and Electronics Engineers (IEEE) 802.11ah S1G_SHORT PPDU, according to some embodiments.

FIG. 12B is a diagram showing a SIG-2 field format for an IEEE 802.11ah S1G_SHORT PPDU, according to some embodiments.

FIG. 13A is a diagram showing a SIG-A-1 field format for an IEEE 802.11ah S1G_LONG SU PPDU, according to some embodiments.

FIG. 13B is a diagram showing a SIG-A-2 field format for an IEEE 802.11ah S1G_LONG SU PPDU, according to some embodiments.

FIG. 14A is a diagram showing a SIG-A-1 field format for an IEEE 802.11ah S1G_LONG MU PPDU, according to some embodiments.

FIG. 14B is a diagram showing a SIG-A-2 field format for an IEEE 802.11ah S1G_LONG MU PPDU, according to some embodiments.

FIG. 25 is a diagram showing a table of types that can be indicated by the type field, according to some embodiments.

FIG. 26 is a diagram showing a table of types of IDs that can be indicated by the ID field, according to some embodiments.

DETAILED DESCRIPTION

Figure 1:
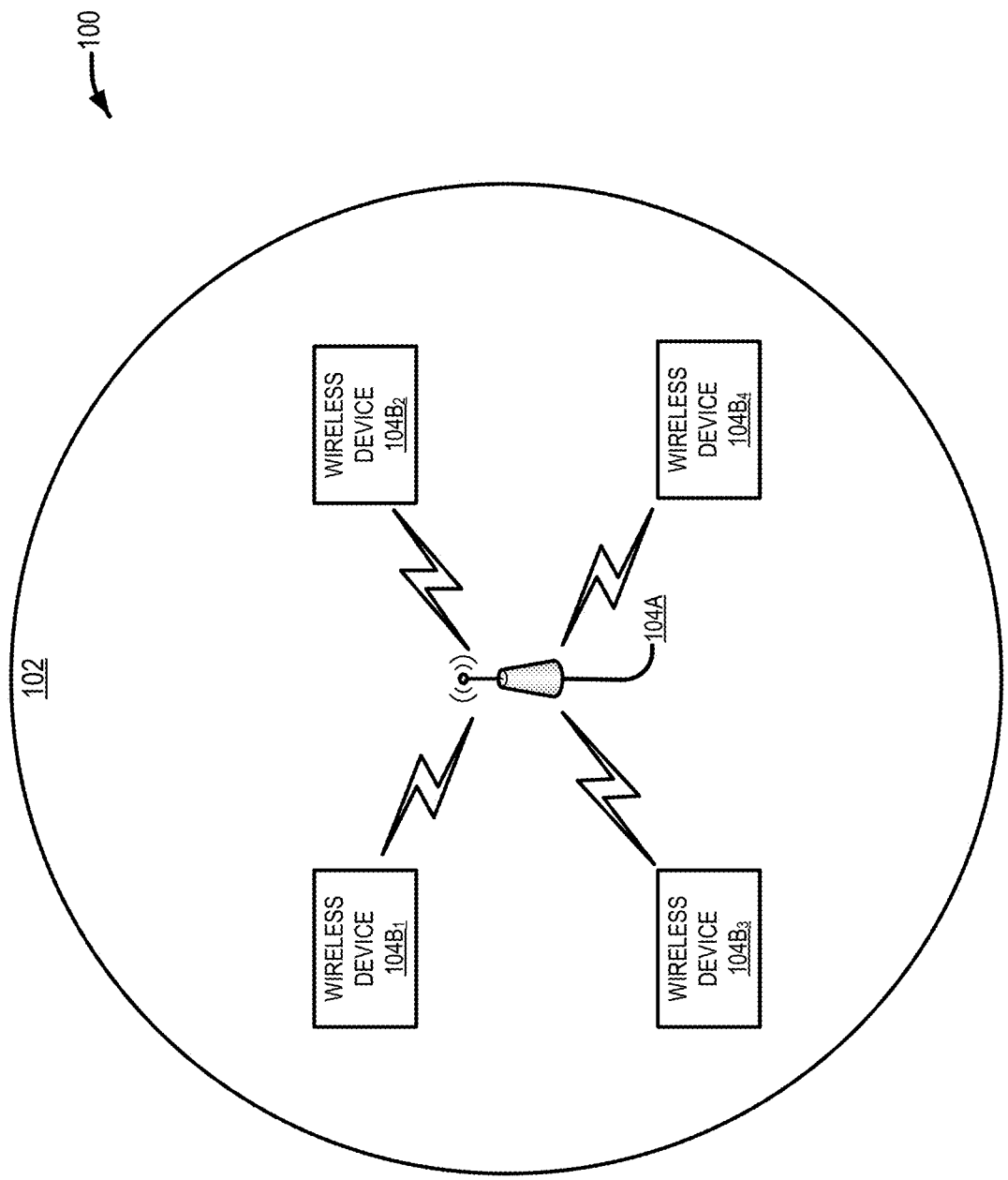
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to reducing power consumption in a wireless network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
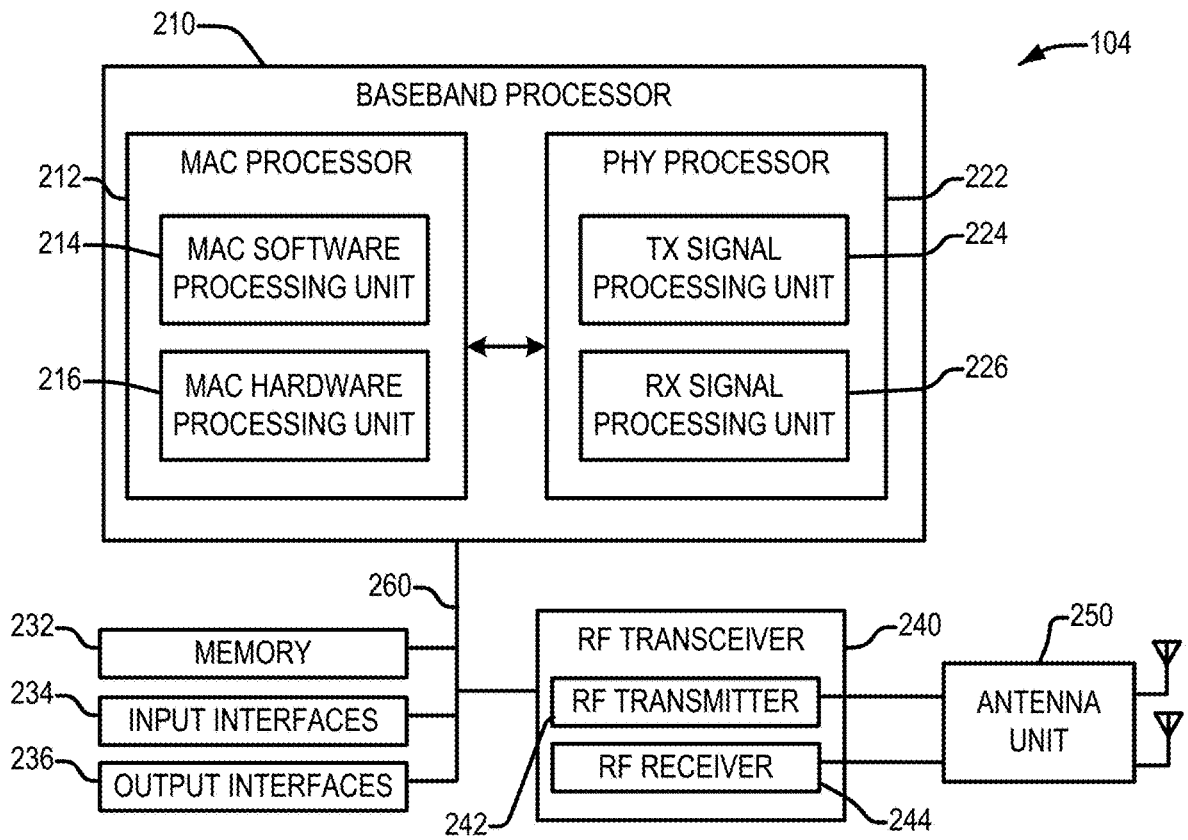
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC)

encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
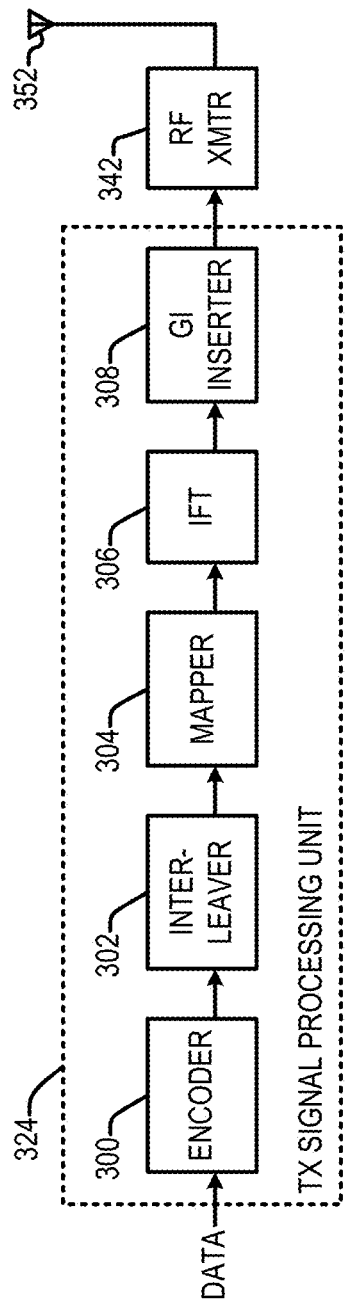
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (Nsts) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
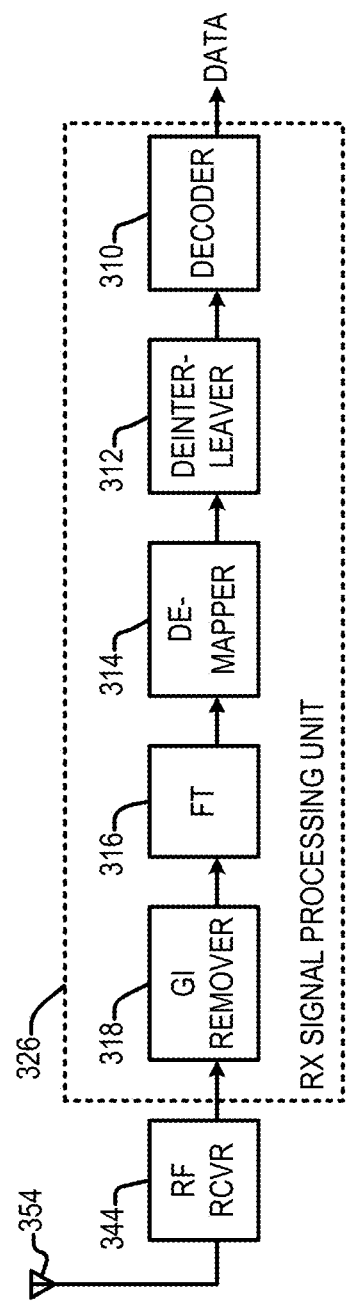
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
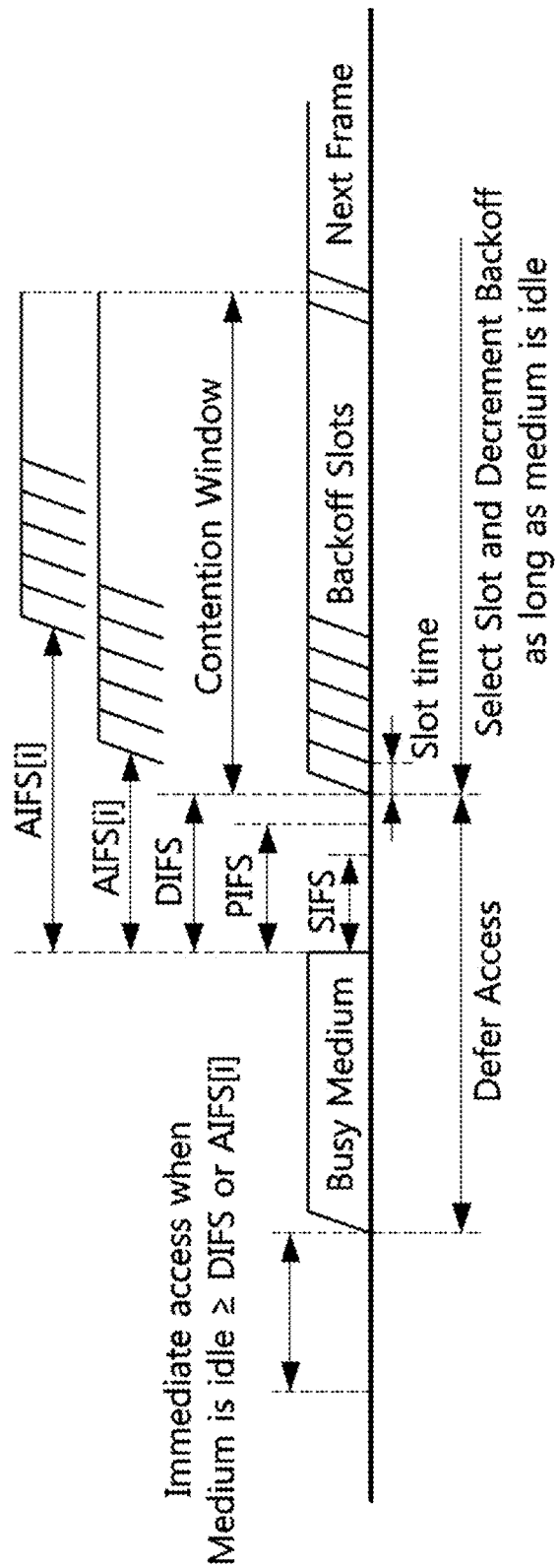
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
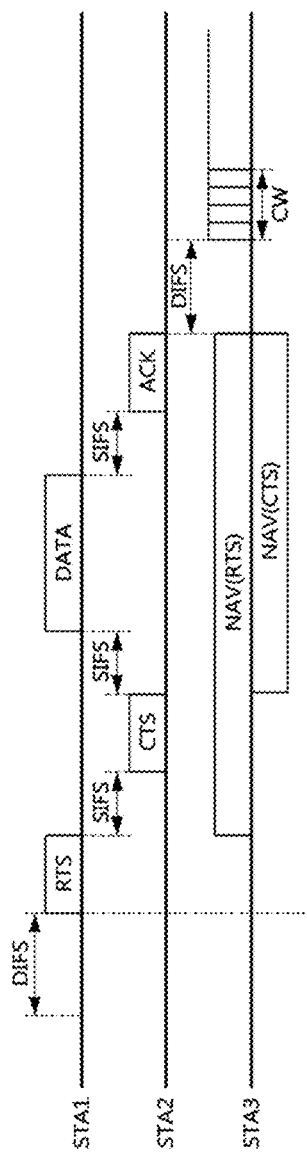
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

In this concept, the main radio (e.g., IEEE 802.11ah) is used for user data transmission and reception. The main radio is turned off unless there is data for it to transmit or receive. The wake-up receiver wakes up the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves as a "wake-up" receiver for the main radio. For this purpose, the wake-up receiver may be a relatively simple receiver. Also, the wake-up receiver may be active while the main radio is turned off. The design of the wake-up receiver may be simple such that its target power consumption is much lower than that of the main radio (e.g., the target power consumption may be less than 100 uW when active). To achieve this goal, the wake-up receiver may use simple modulation schemes such as OOK with repetition (or spreading) schemes instead of complicated modulation schemes that require coherent detection and channel coding schemes.

FIG. 7 is a diagram showing operational examples of a low-power wake-up receiver when there is data to receive and when there is no data to receive, according to some embodiments. As shown in the diagram, when there is no data to receive, the wake-up receiver 740 of the STA 720 is active (it is turned "ON") while the main radio 730 (e.g., an 802.11ah radio) of the STA 720 is turned off (it is turned "OFF") or in a low-power state. This is an example where the STA 720 is in a power-save mode to reduce power consumption. However, when the AP 710 has data 750 to send to the STA 720, the AP may first send a wake-up signal in the form of a wake-up packet (WUP) 760 which is transmitted using a new waveform such as OOK. The wake-up receiver 740 of the STA 720 may receive this wake-up packet 760. Responsive to receiving this wake-up packet 760, the wake-up receiver 740 of the STA 720 may wake up the main radio 730 of the STA 720 (turn the main radio 730 on) so that the main radio 730 becomes active. After the main radio 730 of the STA is active, the AP may send data 750 to the STA (e.g., using 802.11ah), which is received by the main radio 730 of the STA 720. The STA 720 is said to be in an active mode when its main radio 730 is active.

FIG. 8 is a diagram showing components of an 802.11ah STA that supports wake-up receiver operations, according to some embodiments. As shown in the diagram, a wake-up receiver (WUR) transceiver 840 and a main transceiver 830 are coupled to an antenna unit 870. In an embodiment, the main transceiver 830 is an 802.11ah transceiver. The main transceiver 830 is coupled to a baseband processor 880. The WUR transceiver 840 is coupled to a WUR baseband processor 890. The WUR baseband processor 890 is coupled to the baseband processor 880.

When a wake-up signal is transmitted, legacy wireless devices (e.g., wireless devices that do not have wake-up receivers) should defer their transmissions to allow wake-up receivers to receive the wake-up signal correctly. To this end, it is desirable that the legacy wireless devices be able to recognize when a wake-up signal is being transmitted. In an embodiment, to allow legacy wireless devices to recognize a wake-up signal, a wake-up signal that is based on the legacy IEEE 802.11ah PPDU format can be used. FIGS. 9-11 show various PPDU formats in IEEE 802.11ah including a S1G_SHORT PPDU format, S1G_LONG PPDU format, and S1G_1M PPDU format. Various features and formats are described herein in the context of 802.11 standards using terminology of 802.11 standards. Certain details (e.g., the details of certain fields/subfields and their purpose) are omitted herein for sake of conciseness and to avoid obscuring the description.

FIG. 9 is a diagram showing a S1G_SHORT PPDU format, according to some embodiments. As shown in the diagram, the S1G_SHORT PPDU format includes a STF field 902 (2 symbols), a LTF1 field 904 (2 symbols), a SIG field 906 (2 symbols), LTF2~LTFN$_{LTF}$ fields 908 (1 symbol per LTF), and a data field 910. The LTF1 field 904 includes a GI2 field 912, a LTS field 914, and a LTS field 916.

FIG. 10 is a diagram showing a S1G_LONG PPDU format, according to some embodiments. As shown in the diagram, the S1G_LONG PPDU format includes a STF field 1002 (2 symbols), a LTF1 field 1004 (2 symbols), a SIG-A field 1006 (2 symbols), a D-STF field 1008, D-LTF1~D-LTFN$_{LTF}$ fields 1010 (1 symbol per D-LTF), a SIG-B field 1012 (1 symbol), and a data field 1014. The LTF1 field 1004 includes a GI2 field 1016, a LTS field 1018, and a LTS field 1020. The STF field 1002, LTF1 field 1004, and SIG-A field 1006 may form the omnidirectional portion while the D-STF field 1008, D-LTF~D-LTFN$_{LTF}$ fields 1010, SIG-B field 1012, and data field 1014 may form the beamchangeable portion.

FIG. 11 a diagram showing a S1G_1M PPDU format, according to some embodiments. As shown in the diagram, the S1G_1M format includes a STF field 1102 (4 symbols), a LTF1 field 1104 (4 symbols), a SIG field 1106 (6 symbols), LTF2—LTFN$_{LTF}$ fields 1108 (1 symbol per LTF), and a data field 1110. The LTF1 field 1104 includes a GI2 field 1112, a LTS field 1114, a LTS field 1116, a GI2 field 1118, a LTS field 1120, a GI2 field 1122, and a LTS field 1124.

In each frame format, the SIG field or SIG-A field may include information of the corresponding transmission such as length, MCS, number of space-time streams, and so on. FIGS. 12-15 show the SIG field (or SIG-A field) formats for S1G_SHORT, S1G_LONG single user (SU), S1G_LONG multi-user (MU), and S1G_1M PPDUs, respectively. In this and other diagrams bit positions are represented as Bn, where n represents the position.

FIG. 12A is a diagram showing a SIG-1 field format for an IEEE 802.11ah S1G_SHORT PPDU, according to some embodiments. As shown in the diagram, the SIG-1 field format includes a reserved field 1202, a STBC field 1204, an uplink indication field 1206, a BW field 1208, a Nsts field 1210, an ID field 1212, a SGI field 1214, a coding field 1216, a LDPC extra field 1218, a MCS field 1220, and a smoothing field 1222.

FIG. 12B is a diagram showing a SIG-2 field format for an IEEE 802.11ah S1G_SHORT PPDU, according to some embodiments. As shown in the diagram, the SIG-2 field format includes an aggregation field 1230, a length field 1232, a response indication field 1234, a traveling pilots field 1236, a NDP indication field 1238, a CRC field 1240, and a tail field 1242.

FIG. 13A is a diagram showing a SIG-A-1 field format for an IEEE 802.11ah S1G_LONG SU PPDU, according to some embodiments. As shown in the diagram, the SIG-A-1 field format includes a MU/SU field 1302, a STBC field 1304, an uplink indication field 1306, a BW field 1308, a Nsts field 1310, an ID field 1312, a SGI field 1314, a coding field 1316, a LDPC extra field 1318, a MCS field 1320, and a beam-change/smoothing indication field 1322.

FIG. 13B is a diagram showing a SIG-A-2 field format for an IEEE 802.11ah S1G_LONG SU PPDU, according to some embodiments. As shown in the diagram, the SIG-A-2 field format includes an aggregation field 1330, a length field 1332, a response indication field 1334, a reserved field 1336, a traveling pilots field 1338, a CRC field 1340, and a tail field 1342.

FIG. 14A is a diagram showing a SIG-A-1 field format for an IEEE 802.11ah S1G_LONG MU PPDU, according to some embodiments. As shown in the diagram, the SIG-A-1 field format includes a MU/SU field 1402, a STBC field 1404, a reserved field 1406, a Nsts field 1407 (which includes a MU[0] Nsts field 1408, a MU[1] Nsts field 1410, a MU[2] Nsts field 1412, and a MU[3] Nsts field 1414), a BW field 1416, a GB) field 1418, a SGI field 1420, and a coding-I field 1422.

FIG. 14B is a diagram showing a SIG-A-2 field format for an IEEE 802.11ah S1G_LONG MU PPDU, according to some embodiments. As shown in the diagram, the SIG-A-2 field format includes a coding-II field 1430, a reserved field 1432, a length field 1434, a response indication field 1436, a traveling pilots field 1438, a CRC field 1440, and a tail field 1442.

Figure 15:
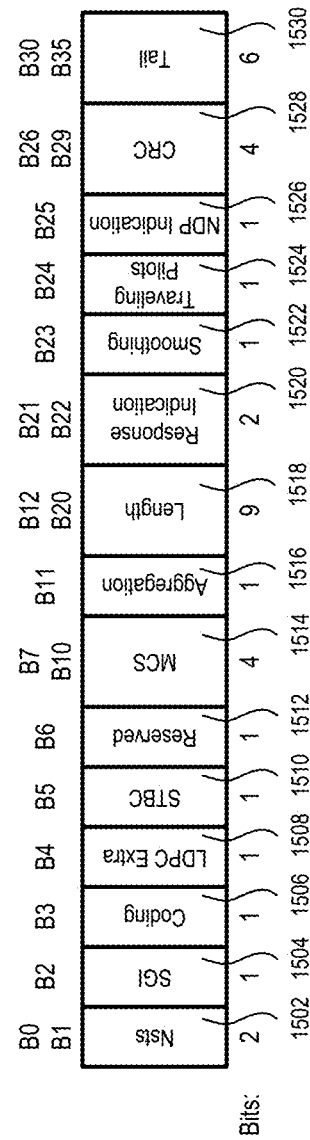
FIG. 15 is a diagram showing a SIG field format for an IEEE 802.11ah S1G_1M PPDU, according to some embodiments.

FIG. 15 is a diagram showing a SIG field format for an IEEE 802.11ah S1G_1M PPDU, according to some embodiments. As shown in the diagram, the SIG field format includes a Nsts field 1502, a SGI field 1504, a coding field 1506, a LDPC extra field 1508, a STBC field 1510, a reserved field 1512, a MCS field 1514, an aggregation field 1516, a length field 1518, a response indication field 1520, a smoothing field 1522, a traveling pilots field 1524, a NDP indication field 1526, a CRC field 1528, and a tail field 1530.

The present disclosure introduces a wake-up receiver configuration and wake-up receiver PPDU format that allows for reducing power consumption in wireless networks, which helps prolong the lifetime of wireless networks. According to an embodiment, a wake-up receiver chip includes a preamble detector and a wake-up receiver processor. If the preamble detector detects a wake-up receiver preamble, the preamble detector may wake up the wake-up receiver processor. The wake-up receiver processor may process the wake-up receiver data corresponding to the wake-up receiver preamble (e.g., the wake-up receiver data that comes immediately after the wake-up receiver preamble) and determine whether the main radio should be woken up based on the wake-up receiver data. The wake-up receiver processor may wake up the main radio if the wake-up receiver processor determines that the main radio should be woken up. According to another embodiment, a wake-up receiver chip includes a preamble detector, an ID matcher, and a wake-up receiver processor. If the preamble detector detects a wake-up receiver preamble, the preamble detector may wake up the ID matcher. The ID matcher may process a portion of the wake-up receiver data corresponding to the wake-up receiver preamble that indicates an identifier. The ID matcher may determine whether to wake up the wake-up receiver processor based on the identifier. The ID matcher may wake up the wake-up receiver processor if the ID matcher determines that the wake-up receiver processor should be woken up. The wake-up receiver processor may process the remaining portion of the wake-up receiver data and determine whether the main radio should be woken up based on this data. The wake-up receiver processor may wake up the main radio if the wake-up receiver processor determines that the main radio should be woken up. Having separate components for preamble detection, ID matching, and/or wake-up receiver data processing may help reduce power consumption of the wake-up receiver chip (since components can be turned "on" as they are needed instead of being continually "on").

Figure 16:
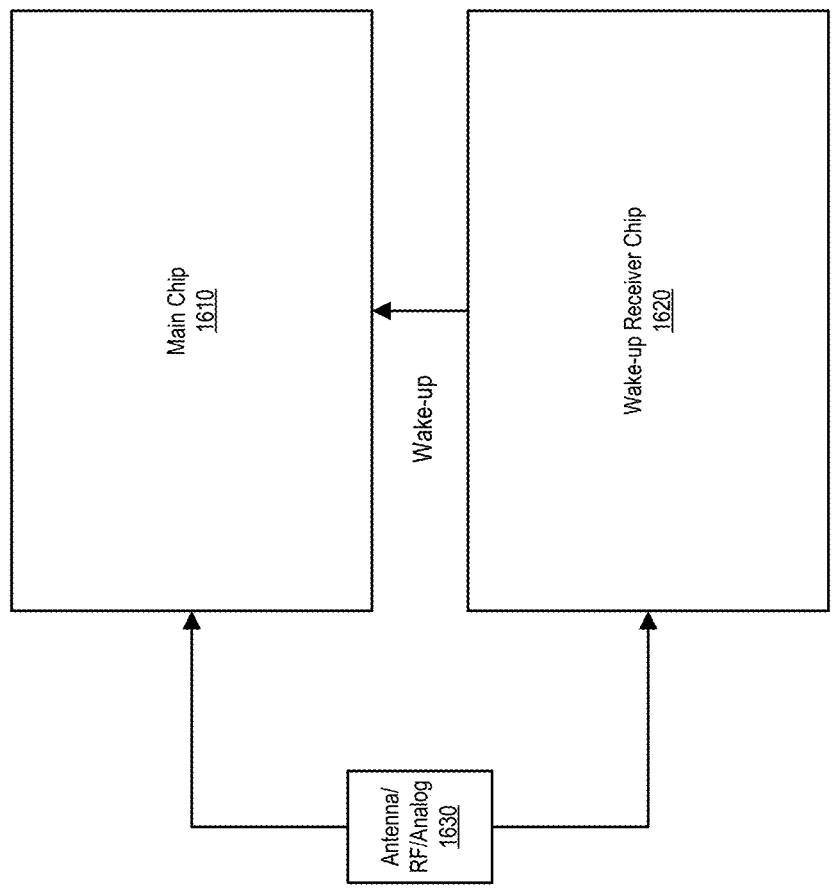
FIG. 16 is a diagram showing a simplified architecture for wake-up receiver, according to some embodiments.

FIG. 16 is a diagram showing a simplified architecture for wake-up receiver, according to some embodiments. As shown in the diagram, the simplified architecture includes a main chip 1610 and a wake-up receiver (WUR) chip 1620 that each receive/process signals from an antenna 1630. The wake-up receiver chip 1620 may wake up the main chip 1610 if the wake-up receiver chip 1620 receives a wake-up signal.

Figure 17:
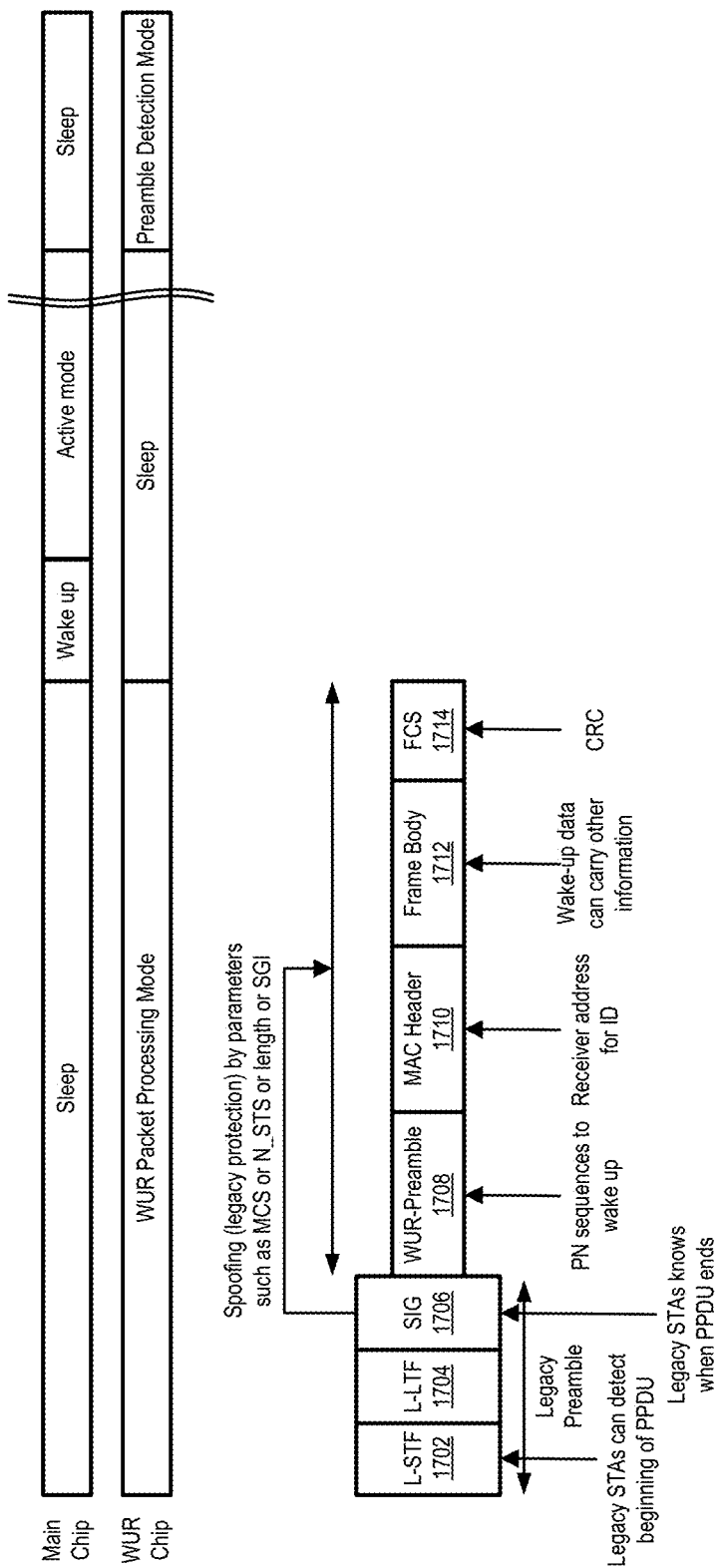
FIG. 17 is a timing diagram showing the state of the main chip and the wake-up receiver chip when receiving a wake-up receiver PPDU, according to some embodiments.

FIG. 17 is a timing diagram showing the state of the main chip and the wake-up receiver chip when receiving a wake-up receiver PPDU, according to some embodiments. When an AP transmits a wake-up signal, it is desirable that legacy wireless devices (e.g., STAs) that operate in the same band understand that the channel is busy. For this purpose, a wake-up receiver PPDU transmission may start with the transmission of a legacy preamble. This legacy preamble may include training fields (L-STF 1702 and L-LTF 1704) and a signal field (SIG) 1706. In an embodiment, the signal field includes one or more parameters that indicate the frame duration. Legacy wireless devices may receive and decode this legacy preamble and determine that the channel will be busy for the transmission duration of the wake-up receiver PPDU. In an embodiment, the transmission of the legacy preamble may be followed by transmission of a BPSK-Mark field (BPSK refers to binary phase shift keying), which may be added to prevent 802.11ah devices from switching to the channel idle state.

The remainder of the wake-up receiver PPDU (the portion that comes after the legacy preamble—which may be referred to as the wake-up receiver portion of the PPDU) may only be received by the wake-up receiver. To reduce power consumption of the wake-up receiver, the wake-up receiver may use a simple on-off keying (OOK) modulation scheme and a narrow band. The wake-up receiver portion of the wake-up receiver PPDU may include a wake-up receiver preamble portion that includes a wake-up receiver preamble 1708 (also referred to as a wake-up receiver sync) and a wake-up receiver data portion that includes a MAC header 1710, a frame body 1712, and a FCS 1714. When its primary connectivity radio (PCR) (i.e., main radio) is off, the wireless device cannot capture the legacy preamble. The wake-up receiver preamble 1708 is used to allow a wake-up receiver to synchronize to a wake-up signal. Also, the wake-up receiver preamble 1708 may be used to indicate which data rate (e.g., low data rate (LDR) or high data rate (HDR)) is used to transmit the wake-up receiver data portion. For example, to indicate HDR, the wake-up receiver preamble 1708 may include a unique 32-bit sequence, with each bit being represented by a 2 µs OOK symbol. To indicate LDR, the sequence may be inverted and duplicated. The wake-up receiver data portion may be used to carry a payload from the MAC layer encoded with a Manchester-based code. In the case of LDR, input bit '1' may be encoded as '1010' and input bit '0' may be encoded as '0101', which are transmitted with 4 µs OOK symbols. In case of HDR, input bit '1' may be encoded as '10' and input bit '0' may be encoded as '01', which are transmitted with 2 µs OOK symbols. Thus, the wake-up receiver data portion may be transmitted at either 62.5 kbps or 250 kbps.

IEEE 802.11ba defines four types of MAC frames: (i) wake-up receiver wake-up frames that trigger the STA to switch on its PCR, (ii) wake-up receiver beacon frames that are periodically sent to provide timing synchronization, (iii) wake-up receiver discovery frames that are used to allow a STA to perform low power network discovery without interruption of the connectivity with the current AP, and (iv) vendor-specific frames that are out of the scope of the standard. In an embodiment, at the MAC layer, wake-up receiver frames are relatively short and contain: (i) the frame control field (8 bits) that determines the type of the frame and its length if the length exceeds 48 bits, (ii) shortened address (12 bits), (iii) type dependent control information (12 bits) (e.g., the current clock value, the counter indicating crucial network configuration updates, etc.), (iv) optional frame body, and (v) frame checksum (16 bits). Wake-up receiver frames are transmitted according to the EDCA (enhanced distributed channel access) rules. Since the STAs do not use wake-up receiver for transmission, even unicast wake-up receiver frames may be transmitted without acknowledgment. Consequently, the retry counter and the contention window of the binary exponential backoff may not be increased if the transmission fails.

To enable wake-up receiver functionality, a STA may negotiate its parameters with the AP. For example, the STA and AP may agree on a channel that is to be used for wake-up receiver frame transmission and the power management method which is used to retrieve the data from the AP after the STA is woken up. For that, the basic power management approach, Unscheduled Automatic Power Save Delivery (U-APSD), Target Wake Time (TWT), or another method can be used. After such a negotiation, the STA may switch off its PCR and switch on the wake-up receiver. To notify a STA to switch on its PCR (e.g., if the AP has buffered data for this STA), the AP transmits a wake-up receiver wake-up frame to the STA. Switching the PCR on takes some time, the maximal value of which is indicated by the STAs to the AP. To notify the AP that it is waking up, the STA may send a frame to the AP. This frame may be an uplink data frame or a frame for retrieving the buffered data (e.g., a PS-Poll). The AP may only transmit data in the downlink with PCR if it receives such a frame or the switching on timeout indicated by the STA has expired. A wake-up receiver wake-up frame may be a unicast frame or a groupcast frame. If the MAC header's ID matches its own, the main chip is woken up using control information after completing the decoding process.

As shown in the diagram, the main chip 1610 may be in sleep mode and the wake-up receiver chip 1620 may be in wake-up receiver packet processing mode (a mode in which the wake-up receiver chip 1620 may receive and process a wake-up receiver PPDU) when receiving the wake-up receiver PPDU. The wake-up receiver chip 1620 may process the wake-up receiver PPDU to determine whether the main chip 1610 is to be woken up. If the wake-up receiver chip 1620 determines that the main chip 1610 is to be woken up, then the wake-up receiver processor 1820 may wake up the main chip such that the main chip is in active mode. The wake-up receiver chip 1620 may transition to sleep mode after processing the wake-up receiver PPDU. The main chip 1610 may receive/transmit data while it is in active mode. Subsequently, the main chip 1610 may transition to sleep mode while the wake-up receiver chip 1620 transitions to preamble detection mode.

Figure 18:
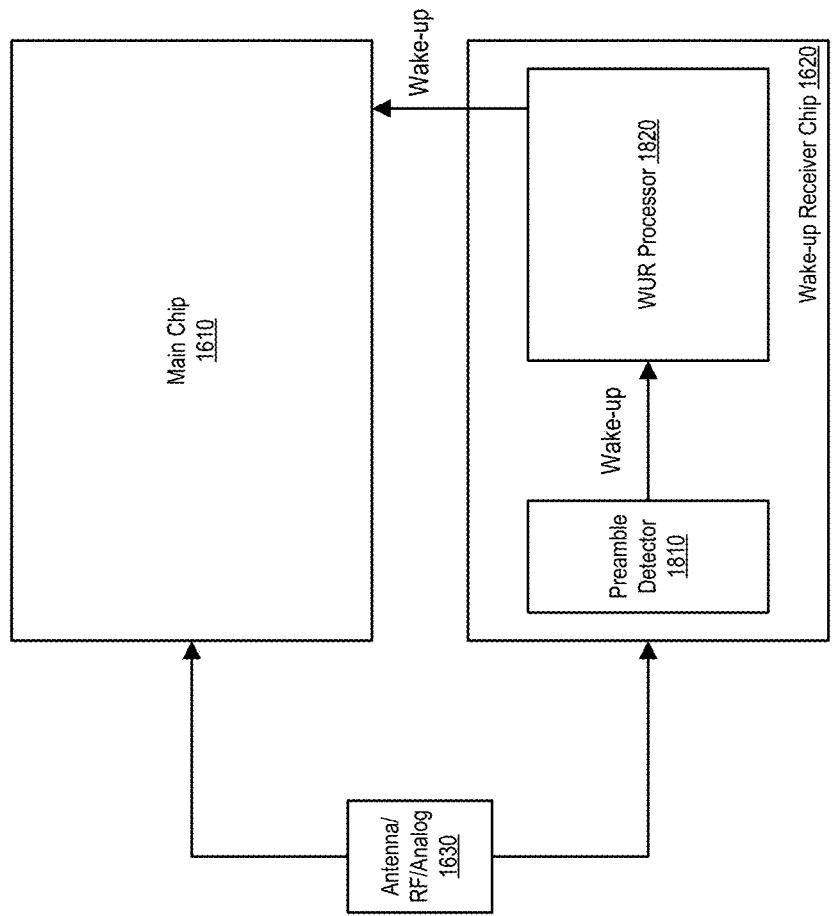
FIG. 18 is a diagram showing an architecture for wake-up receiver that includes a preamble detector and a wake-up receiver processor, according to some embodiments.

FIG. 18 is a diagram showing an architecture for wake-up receiver that includes a preamble detector and a wake-up receiver processor, according to some embodiments.

Figure 19:
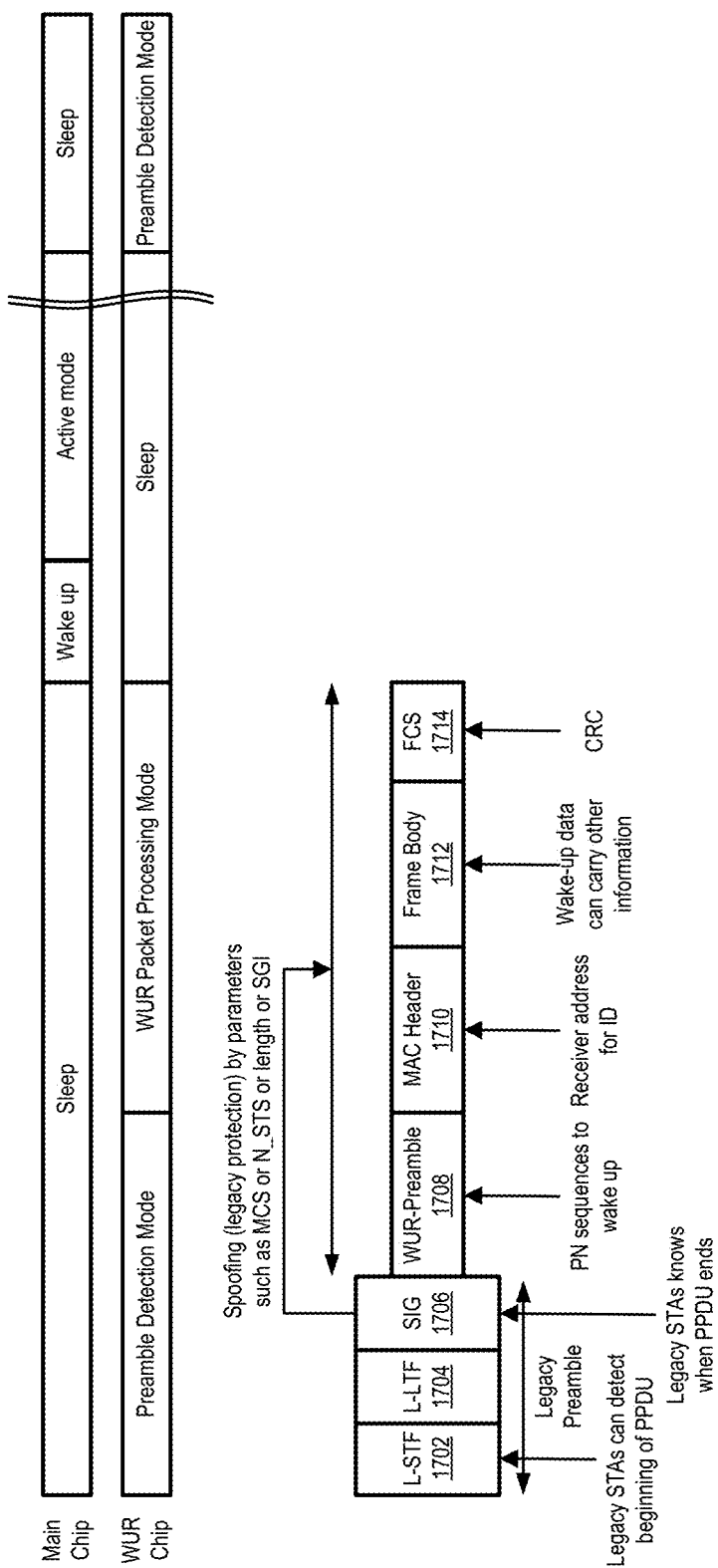
FIG. 19 is a timing diagram showing the state of the main chip and the wake-up receiver chip using the new architecture when receiving a wake-up receiver PPDU, according to some embodiments.

As shown in the diagram, the architecture includes a wake-up receiver chip 1620 that includes a preamble detector 1810 and a wake-up receiver processor 1820. As shown in FIGS. 18 and 19 and further described herein, the separation of the preamble detector 1810 and the wake-up receiver processor 1820 may help further reduce the power consumption of the wake-up receiver chip 1620. In an embodiment, the preamble detector 180 wakes up the wake-up receiver processor 1820 when the preamble detector 180 detects a wake-up receiver preamble. The wake-up receiver processor 1820 may then perform the remainder of the wake-up receiver operations (e.g., processing the wake-up receiver data portion and determining whether to wake up the main chip 1610 based on the data included in the wake-up receiver data portion).

FIG. 19 is a timing diagram showing the state of the main chip and the wake-up receiver chip using the new architecture when receiving a wake-up receiver PPDU, according to some embodiments.

As shown in the diagram, the main chip 1610 is in sleep mode and the wake-up receiver chip 1620 is in preamble detection mode (a mode in which the preamble detector 1810 is in awake mode but wake-up receiver processor 1820 is in sleep mode) when initially receiving the wake-up receiver PPDU. If the preamble detector 1810 detects the wake-up receiver preamble 1708, the preamble detector 1810 may wake up the wake-up receiver processor 1820 such that the wake-up receiver chip 1620 is in wake-up receiver packet processing mode. The wake-up receiver processor 1820 may then process the wake-up receiver data portion (e.g., including the MAC header 1710, frame body 1712, and FCS 1714) to determine whether the main chip 1610 is to be woken up. If the wake-up receiver processor 1820 determines that the main chip 1610 is to be woken up, then the wake-up receiver processor 1820 may wake up the main chip 1610 such that the main chip is in active mode. The wake-up receiver chip 1620 may transition to sleep mode (a mode in which both the preamble detector 1810 and the wake-up receiver processor 1820 are in sleep mode) after processing the wake-up receiver PPDU. The main chip 1610 may receive/transmit data while it is in active mode. Subsequently, the main chip 1610 may transition to sleep mode while the wake-up receiver chip 1620 transitions to preamble detection mode.

Figure 20:
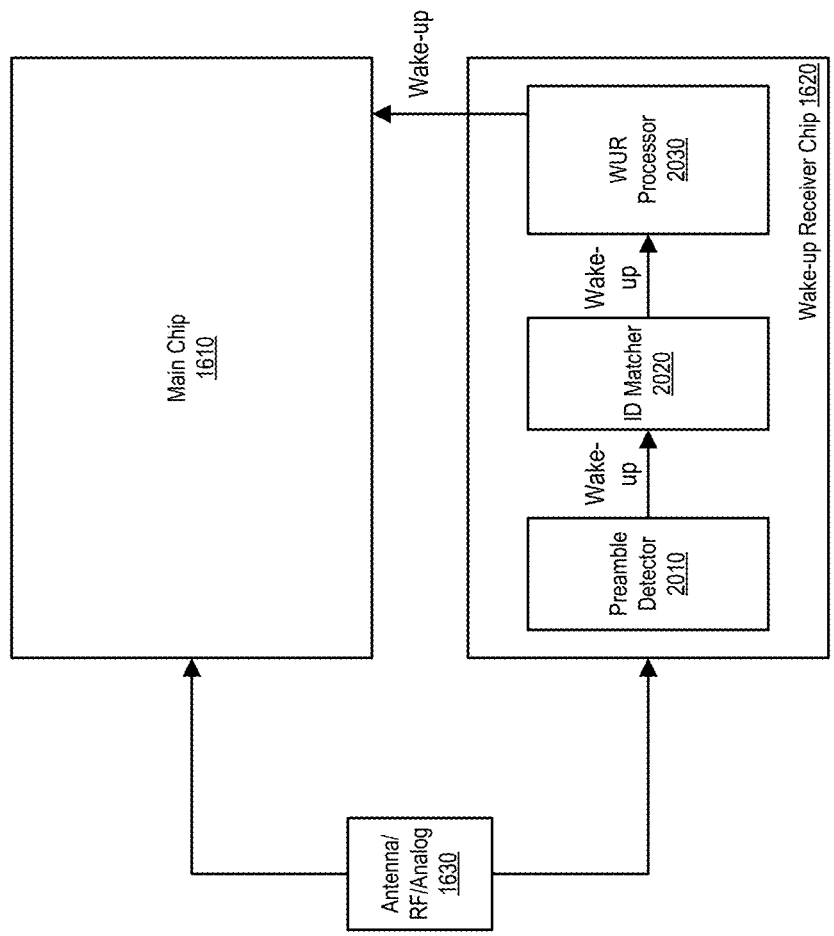
FIG. 20 is a diagram showing an architecture for wake-up receiver that includes a preamble detector, an ID matcher, and a wake-up receiver processor, according to some embodiments.

FIG. 20 is a diagram showing an architecture for wake-up receiver that includes a preamble detector, an ID matcher, and a wake-up receiver processor, according to some embodiments.

Figure 21:
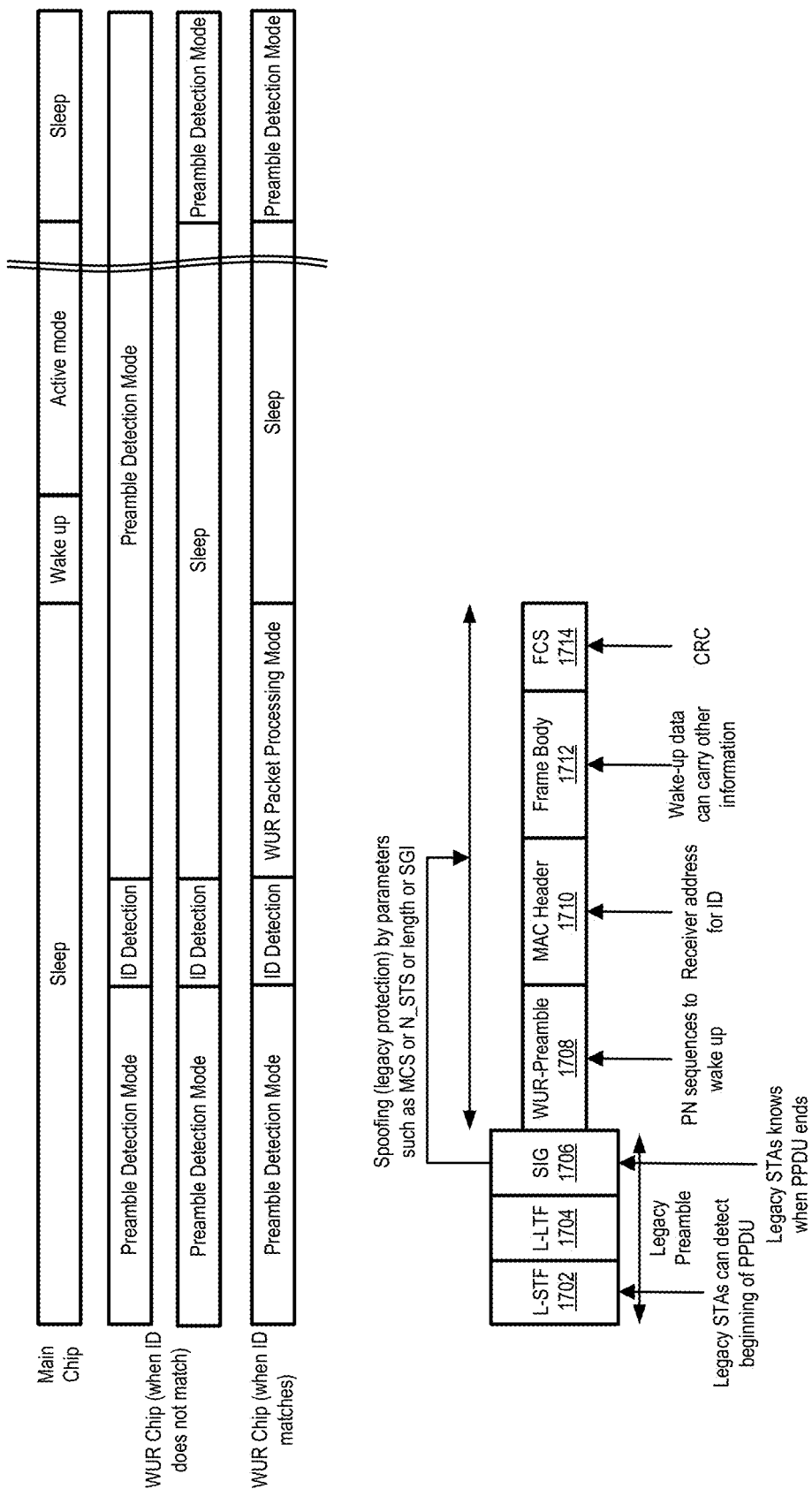
FIG. 21 is a diagram showing the state of the main chip and the wake-up receiver chip using the new architecture when receiving a wake-up receiver PPDU, according to some embodiments.

As shown in the diagram, the architecture includes a wake-up receiver chip 1620 that includes a preamble detector 2010, an ID matcher 2020, and a wake-up receiver processor 2030. As shown in FIGS. 20 and 21 and further described herein, having a separate ID matcher 2020 may help further reduce the power consumption of the wake-up receiver chip 1620. In an embodiment, the preamble detector 2010 wakes up the ID matcher 2020 when the preamble detector 2010 detects a wake-up receiver preamble. The ID matcher 2020 may then process a portion of wake-up receiver data that indicates an identifier (e.g., the MAC header) to determine whether the identifier matches the identifier of the STA. If the ID matcher 2020 determines that the identifier matches, then the ID matcher 2020 may wake up the wake-up receiver processor 2030. The wake-up receiver processor 2030 may then perform the remainder of the wake-up receiver operations (e.g., processing the remainder of the wake-up receiver data portion and determining whether to wake up the main chip 1610 based on the data included in the wake-up receiver data portion). If the ID matcher 2020 determines that the identifier does not match, then the wake-up receiver chip 1620 may stay in the preamble detection mode (a mode in which the preamble detector 2010 is in awake mode but ID matcher 2020 and wake-up receiver processor 2030 are in sleep mode) or go into a sleep mode (a mode in which the preamble detector 2010, ID matcher 2020, and wake-up receiver processor 2030 are all in sleep mode).

FIG. 21 is a diagram showing the state of the main chip and the wake-up receiver chip using the new architecture when receiving a wake-up receiver PPDU, according to some embodiments.

As shown in the diagram, the main chip 1610 is in sleep mode and the wake-up receiver chip 1620 is in preamble detection mode when initially receiving the wake-up receiver PPDU. If the preamble detector 2010 detects the wake-up receiver preamble 1708, the preamble detector 2010 may wake up the ID matcher 2020 to perform ID detection. The ID matcher 2020 may determine whether the identifier included in the MAC header 1710 matches the identifier of the STA. If the identifier does not match, then the wake-up receiver chip 1620 may stay in the preamble detection mode or transition to sleep mode. If the ID matcher 2020 determines that the identifier matches, then the ID matcher 2020 may wake up the wake-up receiver processor 2030 such that the wake-up receiver chip 1620 is in wake-up receiver packet processing mode. The wake-up receiver processor 2030 may process the remainder of the wake-up receiver data portion (e.g., including the frame body 1712 and FCS 1714) to determine whether the main chip 1610 is to be woken up. If the wake-up receiver processor 2030 determines that the main chip 1610 is to be woken up, then the wake-up receiver processor 2030 may wake up the main chip 1610 such that the main chip 1610 is in active mode. The wake-up receiver chip 1620 may transition to sleep mode after processing the wake-up receiver PPDU. The main chip 1610 may transmit/receive data while it is in active mode. Subsequently, the main chip 1610 may transition to sleep mode while the wake-up receiver chip 1620 transitions to preamble detection mode.

Figure 22:
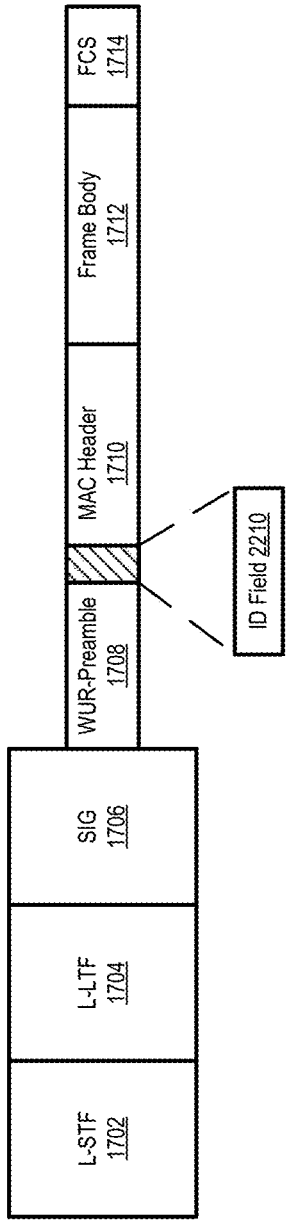
FIG. 22 is a diagram showing a format for a wake-up receiver PPDU, according to some embodiments.

FIG. 22 is a diagram showing a format for a wake-up receiver PPDU, according to some embodiments. As shown in the diagram, the format includes a L-STF field 1702, a L-LTF field 1704, a SIG field 1706, which may collectively form a legacy preamble. Also, as shown in the diagram, the format further includes a wake-up receiver preamble field 1708, a MAC header field 1710, a frame body field 1712, and a FCS (frame check sequence) field 1714. In an embodiment, as shown in the diagram, the MAC header field 1710 includes an ID field 2210. The ID field 2210 may be used to indicate the identifier of the intended recipient(s) of a wake-up receiver frame.

Figure 23:
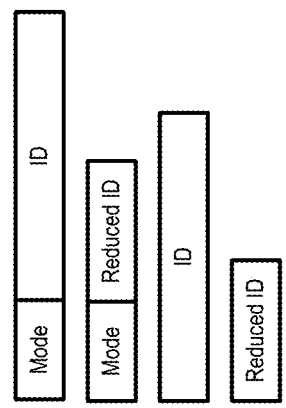
FIG. 23 is a diagram showing ID field types, according to some embodiments.

FIG. 23 is a diagram showing ID field types, according to some embodiments. The diagram shows four different ID field types. The first ID field type includes a mode field and a full ID field. The second ID field type includes a mode field and a reduced ID field. The third ID field type includes a full ID field. The fourth ID field type includes a reduced ID field. The reduced ID may be expressed as a subset of bits of the full ID or as a hash value of the full ID. The mode field may be used to indicate what type of ID is being used. For example, if the mode field includes a value of binary '1', it indicates that a full ID is being used, and if the mode field includes a value of binary '0', it indicates that a reduced ID is being used. As another example, if the mode field (having two bits) includes a value of binary '00' it indicates that a group ID is being used, if the mode field includes a value of binary '01' it indicates that an AP ID is being used, if the mode field includes a value of binary '10' it indicates that a BSSID ID is being used, and if the mode field includes a value of binary '11' it indicates that a WUR ID is being used. As another example, the recognition of both of the above can be achieved using 3 bits of the mode field.

Figure 24:
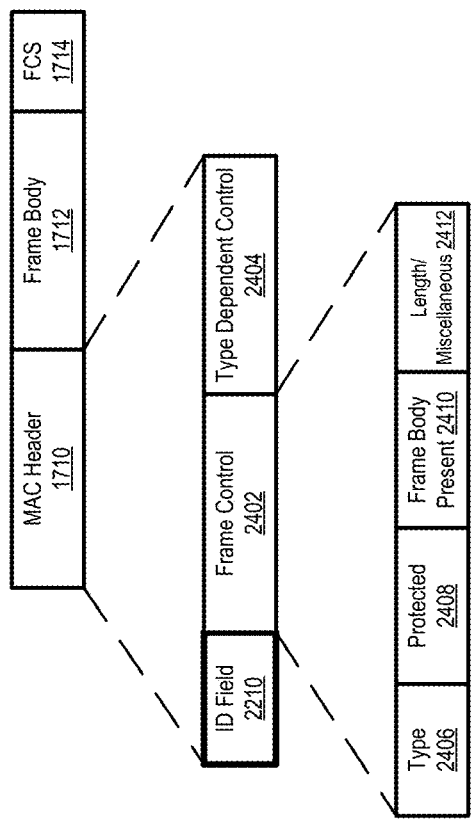
FIG. 24 is a diagram showing a frame format for a wake-up receiver frame, according to some embodiments.

FIG. 24 is a diagram showing a frame format for a wake-up receiver frame, according to some embodiments. As shown in the diagram, the frame format includes a MAC header field 1710, a frame body field 1712, and a FCS field 1714. The frame body field may be optional for certain wake-up receiver frame types. The MAC header field 1710 may include an ID field 2210, a frame control field 2402, and a type dependent control field 2404. The frame control field 2402 may include a type field 2406, a protected field 2408, a frame body present field 2410, and a length/miscellaneous field 2412.

FIG. 25 is a diagram showing a table of types that can be indicated by the type field, according to some embodiments. The type field 2406 may be used to indicate the type of the wake-up receiver frame. For example, as shown in the diagram, the type field may indicate one of the following types: wake-up receiver beacon frame, wake-up receiver wake-up frame, wake-up receiver vendor specific frame, wake-up receiver discovery frame, and wake-up receiver short wake-up frame. Certain values for the type field 2406 (e.g., 5-7) may be reserved.

In an embodiment, the protected field 2408 is set to have a value of binary '1' if the wake-up receiver frame is protected using a message integrity check algorithm. Otherwise, the protected field 2408 is set to have a value of binary '0' to indicate that the wake-up receiver frame contains a 16-bit CRC (cyclic redundancy check). The frame body present field 2410 may be used to indicate whether the frame body field 1712 is present or not. In an embodiment, if the frame body field is present, the wake-up receiver frame has variable length. Otherwise, the wake-up receiver frame has a fixed length. The length/miscellaneous field 2412 may include a length field and a miscellaneous field (not shown). In an embodiment, the length field is used to indicate the length of the frame body field 2410 and the miscellaneous field is reserved.

FIG. 26 is a diagram showing a table of types of IDs that can be indicated by the ID field, according to some embodiments. The ID field 2210 may be used to indicate an ID. The ID field 2210 may indicate different types of IDs. The type of ID may depend on the type of wake-up receiver frame that is being transmitted. In an embodiment, the ID indicated by the ID field 2210 is selected from an identifier space, which consists of all integer values between 0 and 4095. In an embodiment, a WUR AP STA (an AP that supports wake-up receiver functionality) that maintains a list of multiple IDs shall ensure that each ID that is included in a transmitted wake-up receiver frame is either a transmitter ID, a WUR group ID, a WUR ID, a nontransmitter ID, or a portion of the organizationally unique identifier (OUI).

As shown in the diagram, the ID indicated by the ID field 2210 may be a transmitter ID, a nontransmitter ID, a WUR group ID, a WUR ID, or an OUI1. The transmitter ID is an identifier of the transmitting AP. The nontransmitter ID is the identifier of the nontransmitted BSSID. The WUR group ID is an identifier of a group of receiving WUR non-AP STAs. The WUR ID is an identifier of an individual receiving WUR non-AP STA (a non-AP STA that supports wake-up receiver functionality). The OUI1 is the 12 least significant bits (LSBs) of the OUI.

In an embodiment, the list of IDs maintained by the WUR non-AP STA include: a WUR ID for wake-up receiver short wake-up frames and individually addressed wake-up receiver wake-up frames; a transmitter ID for wake-up receiver beacon frames, wake-up receiver discovery frames, and broadcast wake-up receiver wake-up frames sent by the AP corresponding to the transmitted BSSID; a nontransmitter ID for broadcast wake-up receiver wake-up frames sent by the AP corresponding to the nontransmitted BSSID; a set containing zero or more instances of 12 LSBs of an OUI for wake-up receiver vendor specific frames; a set containing zero or more instances of a group ID for group addressed wake-up receiver frames and wake-up receiver wake-up frames.

In an embodiment, the frame body field 1712 is a variable-length field that includes information specific to an individual wake-up receiver frame type. The FCS field 1714 may include a 16-bit CRC when the protected field 2408 in the frame control field 2402 is set to binary '0' and include a 16-bit message integrity check when the protected field 2408 in the frame control field 2402 is set to binary '1'.

In an embodiment, the transmitter ID identifies the WUR AP STA transmitting the wake-up receiver frame, and is used in broadcast wake-up receiver frames that are addressed to all WUR non-AP STAs associated with the WUR AP STA when multiple BSSID operation is not supported or that are addressed to all WUR non-AP STAs associated with the transmitted BSSID of a multiple BSSID set when multiple BSSID operation is supported or that are addressed to all WUR non-AP STAs that intend to discover or synchronize with the WUR AP STA.

In an embodiment, the nontransmitter ID is an identifier used by a WUR AP STA to identify broadcast wake-up receiver frames that are addressed to all WUR non-AP STAs associated with an AP corresponding to a nontransmitted BSSID from the multiple BSSID set when multiple BSSID operation is supported. In an embodiment, a wake-up receiver wake-up frame is a broadcast wake-up receiver wake-up frame if the wake-up receiver wake-up frame has a nontransmitter ID in the ID field 2210.

In an embodiment, a wake-up receiver wake-up frame is a broadcast wake-up receiver wake-up frame if the wake-up receiver wake-up frame has a transmitter ID in the ID field. In an embodiment, a WUR group ID identifies a group of one or more WUR non-AP STAs and is selected from a WUR group ID space, which is a subset of consecutive values obtained from the identifier space. A STA supporting WUR group ID operation may be woken up by a multicast wake-up frame. The group ID may be carried in the address field of a wake-up frame to identify one or more WUR STAB belonging the same group.

In an embodiment, a WUR ID identifies the WUR non-AP STA that is the intended recipient of a wake-up receiver frame. A wake-up receiver frame with a WUR ID in the ID field 2210 may be referred to as an individually addressed wake-up receiver frame that is addressed to the WUR non-AP STA identified by that WUR ID. OUI1 may correspond to the organization identifier field of an OUI that uniquely identifies a vendor, manufacturer, or other organization.

By employing the wake-up receiver PPDU format described herein, the power consumption of IEEE 802.11ah wireless devices can be significantly reduced and thus the network operation lifetime can be extended. The proposed wake-up receiver PPDU format may be backwards compatible with the legacy IEEE 802.11ah standard. Thus, new wireless devices that support wake-up receiver functionality can coexist with legacy wireless devices, and realize the power saving features to extend the network operation lifetime.

The present disclosure also introduces implementations that use a programmable wake-up receiver preamble sequence and introduces particular wake-up receiver preamble sequences that can be used to improve carrier sensing and synchronization performance. According to an embodiment, a wireless device performs a negotiation process with another wireless device to determine a wake-up receiver preamble sequence to use. The wireless device may program the wake-up receiver preamble sequence in a RAM (random access memory) of the wireless device, access the wake-up preamble sequence from the RAM, generate a wake-up receiver preamble based on the wake-up receiver preamble sequence, and wirelessly transmit the wake-up receiver preamble and corresponding wake-up receiver data.

Figure 27:
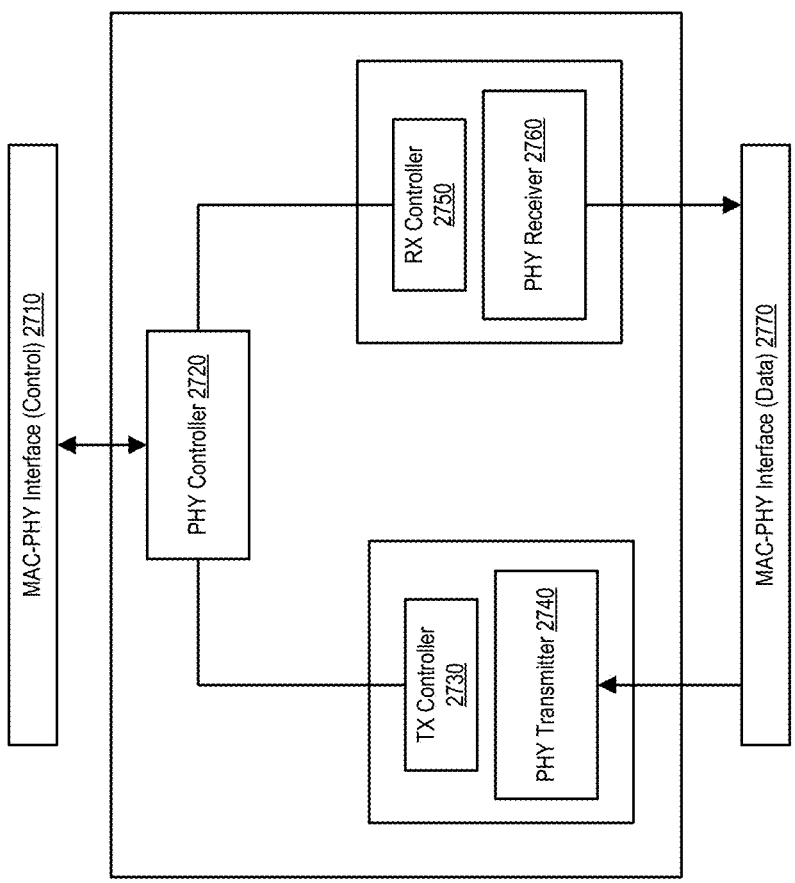
FIG. 27 is a diagram showing an architecture for PHY transmission and reception, according to some embodiments.

FIG. 27 is a diagram showing an architecture for PHY (physical layer) transmission and reception, according to some embodiments. As shown in the diagram, the architecture includes a MAC-PHY interface (control) 2710, a PHY controller 2720, a transmitter (TX) controller 730, a PHY transmitter 2740, a receiver (RX) controller 2750, a PHY receiver 2760, and a MAC-PHY interface (data) 2770.

The PHY transmission or reception mode may be triggered by MAC hardware and software and the state transition may be controlled by MAC software, MAC hardware, as well as the internal signals in PHY. The transmission process may be triggered by TX power enable signal which originates from MAC hardware. After allowing time for RF and analog front-end circuits to turn on, the TX start signal may be generated. The PHY transmitter 2740 may generate STF, LTF, PILOT and QAM Data symbols according to the control input. The PHY controller 2720 may control the TX controller 2730 and the RX controller 2750 to activate the transmission function and reception function. The STF and LTF may also be processed without FFT in this block to prevent data transmission from being delayed.

Figure 28:
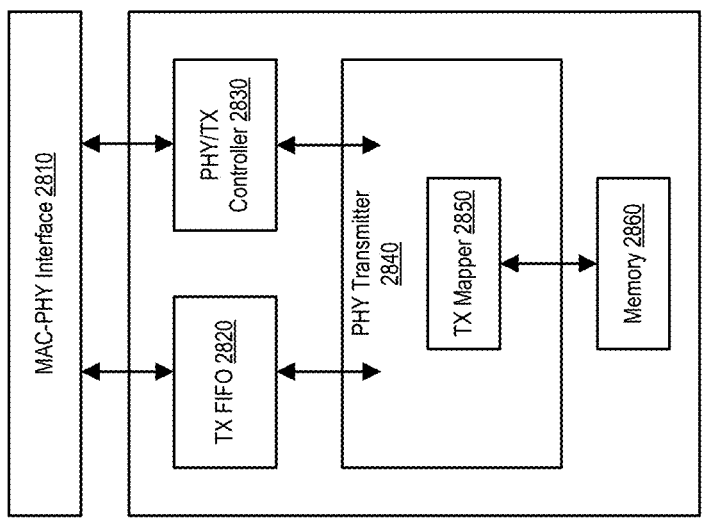
FIG. 28 is a diagram showing a relationship between PHY transmitter, memory, TX FIFO, and controller, according to some embodiments.

FIG. 28 is a diagram showing a relationship between PHY transmitter, memory, TX FIFO, and controller, according to some embodiments. As shown in the diagram, the MAC-PHY interface 2810 may communicate with a TX FIFO 2820 and a PHY/TX controller 2830. The TX FIFO 2820 and the PHY/TX controller 2830 may communicate with a TX mapper 2850 of a PHY transmitter 2840. The TX mapper 2850 may access memory 2860. In an embodiment, when data and control signals are passed to PHY via the MAC-PHY interface 2810, the data is stored in the TX FIFO 2820, which operates the TX mapper 2850 via the PHY/TX controller 2830.

Figure 29:
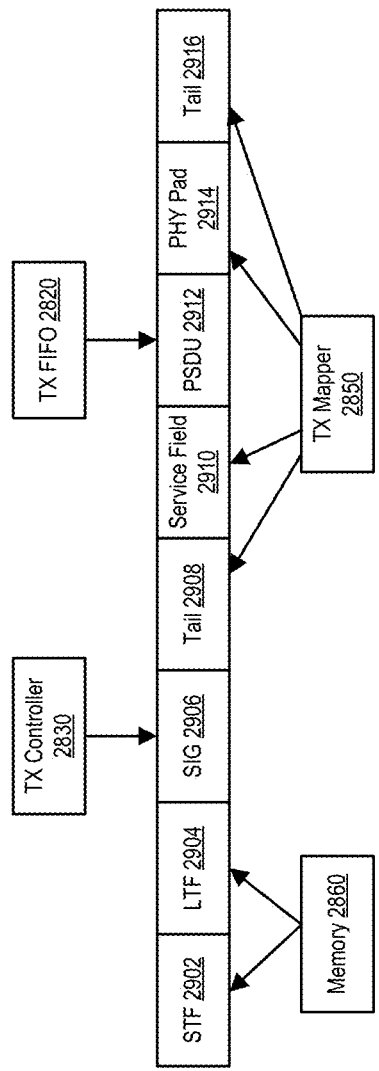
FIG. 29 is a diagram showing TX packet generation, according to some embodiments.

FIG. 29 is a diagram showing TX packet generation, according to some embodiments. As shown in the diagram, the TX packet includes a STF field 2902, a LTF field 2904, a SIG (signal) field 2906, a tail field 2908, a service field 2910, a PSDU field 2912, a PHY Pad field 2914, and another tail field 2916. In an embodiment, the TX mapper 2850 generates a TX packet as shown in the diagram. In an embodiment, the effective signal field 2906 which is directly given by the TX controller 2830 is transferred to the scrambler. After the signal field 2906, the TX mapper 2850 may secure a space for the service field 2910 with eight zero bits and attempt to read 32 bits of source data at once from the TX FIFO 2820 when it is needed. At the next stage, the PHY padding which appends PHY pad bits to the PSDU 2912 may be performed to fill the last symbol.

In an embodiment, the padding flow is as follows. For an S1G SU PPDU with the aggregation bit set to binary '1' in its SIG field, the MAC delivers a PSDU that fills the available octets in the data field of the PPDU. The PHY determines the number of PHY pad bits, and appends them to the PSDU. For an S1G SU PPDU with the aggregation bit set to binary '0' in its SIG field or SIG-A field, MAC padding is not conducted and the PHY directly appends padding bits to the PSDU. It is noted that each of the PHY padding bits is set to '0' and is scrambled in the next block since it could be either '0' or '1'.

In an embodiment, tail bits always have a place in the end of the last symbol according to the IEEE 802.11ah standard. The scrambling may be neglected to keep them zeros. The information, whether or not bits are scrambled for the data field, may be controlled by the TX mapper 2850.

In an embodiment, the functions of the TX mapper 2850 are summarized as follows: 1) reading the signal field 2906 from the TX controller 2830 and inserting tail bits; 2) securing a space for the service field 2910 with eight zero bits; 3) reading data from the TX FIFO 2820; 4) inserting PHY pads if needed; 5) inserting tail bits and indicating the tail position for a data field; 6) delivering above bits to the scrambler; and 7) reading the STF 2902 and LTF 2904 sequences stored in memory 2860 and attaching the preamble sequences to the packet.

The memory 2860 utilized here can be implemented in read only memory (ROM) or random access memory (RAM). RAM is a type of memory/storage that can be used to write or read data, and ROM is a type of storage that can only be used to read stored data. In an embodiment, as will be further described herein, RAM is used to program/store sequences of preambles used to improve the performance and efficiency of the wake-up receiver.

Figures 30, 31:
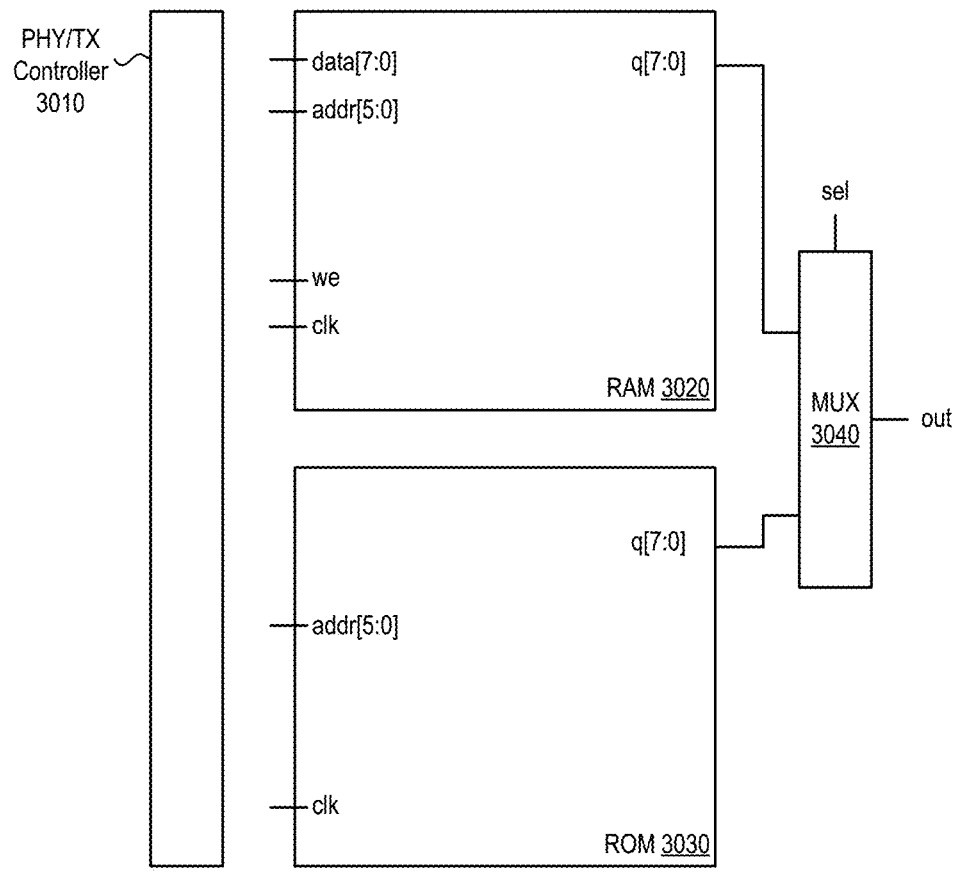
FIG. 30 is a diagram showing a sequence programmable implementation using random access memory (RAM) and read-only memory (ROM), according to some embodiments.
FIG. 31 is a diagram showing a table of the inputs and outputs of the RAM and ROM, according to some embodiments.

FIG. 30 is a diagram showing a sequence programmable implementation using RAM and ROM, according to some embodiments. As shown in the diagram, the implementation includes a PHY/TX controller 3010, a RAM 3020, a ROM 3030, and a MUX 3040. In this example, the RAM 3020 has a 64 bit×8 bit single port RAM design with common read and write addresses. This RAM 3020 may be used to programmatically change the wake-up receiver preamble sequence and utilize it. The inputs and outputs of the RAM 3020 and ROM 3030 are described in FIG. 31.

FIG. 31 is a diagram showing a table of the inputs and outputs of the RAM and ROM, according to some embodiments. As shown in the diagram, "data[7:0]" is an 8-bit data input, "addr[5:0]" is a 6-bit address input, "we" is a write enable input, "clk" is a clock input, "q[7:0]" is an 8-bit data output, "sel" is an input to the MUX 3040 for selecting between the RAM 3020 and ROM 3030, and "out" is the final output.

In an embodiment, a wireless device may request a preamble sequence change. At this point, the wireless device may convey the preamble sequence information to be changed. The wireless device (or more than one wireless device) that receives the request may respond to the preamble sequence change. When negotiation on changing the preamble sequence is completed between wireless devices, the preamble sequence may be loaded into memory by reading the program (hardware or firmware) information. A new sequence may be a predetermined pattern in the form of a ROM in hardware or may be input via firmware. Once a new sequence has been loaded into memory, the wake-up signal may be generated using the new preamble sequence.

A way to determine the preamble/synchronization sequence for the wake-up receiver preamble (hereinafter, denoted as "W") is now described. In addition, examples of wake-up receiver preamble sequences which have been designed with the proposed design approach are provided. The main purpose (or role) of the wake-up receiver preamble is frame synchronization, identification of frame type (e.g., between low data rate (LDR) and high data rate (HDR) packets), and automatic gain control (AGC).

To evaluate the performance of frame synchronization and frame identification, the cross-correlation between the received wake-up receiver preamble and "2*W−1" is determined. The wake-up receiver preamble of an LDR packet consists of two "W" sequences and that of the HDR packet is the bit-converted version of "W" (e.g., bitwise complement sequence of "W"). Thus, when the received packet is the LDR packet, the cross-correlation with "2*W−1" may have the positive peak. However, when the received packet is the HDR packet, the cross-correlation with "2*W−1" may have the negative peak. These positive and negative peaks of the cross-correlation occur when the received preamble sequence and "2*W−1" are matched (e.g., the received packet is synchronized). To achieve frame synchronization even in the low SNR (signal-to-noise ratio) condition, the cross-correlation with offset (e.g., the received sequence and "2*W−1" are not matched) should be as small as possible.

For the frame identification, the negative peak of cross-correlation between the wake-up receiver preamble of the received LDR packet and "2*W−1" should be much larger than the negative peak of cross-correlation between the wake-up receiver preamble of the HDR packet. Moreover, the positive peak of cross-correlation between the wake-up receiver preamble of the received HDR packet and "2*W−1" should be much smaller than the positive peak of cross-correlation between the wake-up receiver preamble of the HDR packet.

For the accurate AGC, the fluctuation of the measured power with a moving window should be as small as possible. For example, if the duration of the power measurement window corresponds to 4-bit wake-up receiver preamble sequence, the number of ones and zeros in the consecutive 4-bit window becomes as constant as possible. If the power fluctuation cannot be avoided, this fluctuation should not occur in the later part of the wake-up receiver preamble sequence.

To determine a good wake-up receiver preamble sequence with 32-bit length, 16 bit locations for ones are randomly selected and the remaining 16 bits are set to be zeros. With this randomly generated sequence, the cross-correlation of LDR wake-up receiver preambles is evaluated with "2*W−1" and the following value is calculated:

$$Cor_{sync,LDR} = \frac{\text{First positive peak of } LDR \text{ cross-correlation}}{\text{Second positive peak of } LDR \text{ cross-correlation}}$$

The cross-correlation of HDR wake-up receiver preambles is evaluated with "2*W−1" and the following value is calculated:

$$Cor_{sync,HDR} = \frac{\text{First negative peak of } HDR \text{ cross-correlation}}{\text{Second negaitive peak of } HDR \text{ cross-correlation}}$$

To assess the frame identification performance, the following values may be calculated:

$$Cor_{id,LDR} = \frac{\text{First positive peak of } LDR \text{ cross-correlation}}{\text{First positive peak of } HDR \text{ of cross-correlation}}$$

$$Cor_{id,HDR} = \frac{\text{First negative peak of } HDR \text{ cross-correlation}}{\text{First negative peak of } LDR \text{ cross-correlation}}$$

As the four values above become larger, the corresponding sequence has better performance in terms of frame synchronization and frame identification.

For assessing the AGC performance, the moving sum of four consecutive bits of ten bits at the end of "W" may be calculated. The sequence having small variation of the moving sum may be selected.

According to such process to determine wake-up receiver preamble sequence, three candidates of the good sequence are selected, which may be as follows:

W1=[0 0 1 1 0 1 1 1 0 1 0 0 1 0 1 0 0 1 0 0 1 1 1 0 0 0 1 1 1 0 1 0]

W2=[1 1 1 0 0 0 1 1 0 0 0 1 0 1 1 1 0 0 1 0 0 0 1 0 1 1 0 1 1 0 1 0]

W3=[0 0 0 1 1 1 0 0 1 1 1 0 1 0 0 0 1 1 0 1 1 1 0 1 0 0 1 0 0 1 0 1]

For the W1 sequence, the four correlation values are $Cor_{sync,LDR}=8$, $Cor_{sync,HDR}=5.3$, $Cor_{id,LDR}=5.3$, and $Cor_{sync,HDR}=8$. The moving sum with 4-bit window is "1 1 2 3 3 3 2".

For the W2 sequence, the four correlation values are $Cor_{sync,LDR}=8$, $Cor_{sync,HDR}=8$, $Cor_{id,LDR}=8$, and $Cor_{sync,HDR}=5.3$. The moving sum with 4-bit window is "3 2 3 3 2 3 2".

For the W3 sequence, the four correlation values are $Cor_{sync,LDR}=8$, $Cor_{sync,HDR}=8$, $Cor_{id,LDR}=5.3$, and $Cor_{sync,HDR}=8$. The moving sum with 4-bit window is "1 2 1 1 2 1 2".

By employing the wake-up receiver techniques described herein, the power consumption of the IEEE 802.11ah devices can be significantly reduced and then the network operation time can be extended. Using the proposed preamble sequence and programmable transmission structures and mechanisms, the wake-up receiver performance and efficiency of WLANs may be improved. In particular, higher correlation sequences may be utilized to improve carrier sensing and synchronization performance. In addition, when wake-up signals occur frequently in dense wake-up receiver networks, using different sequences for each BSS network may improve power consumption efficiency by reducing unnecessary wake-up probabilities by neighboring networks.

Figure 32:
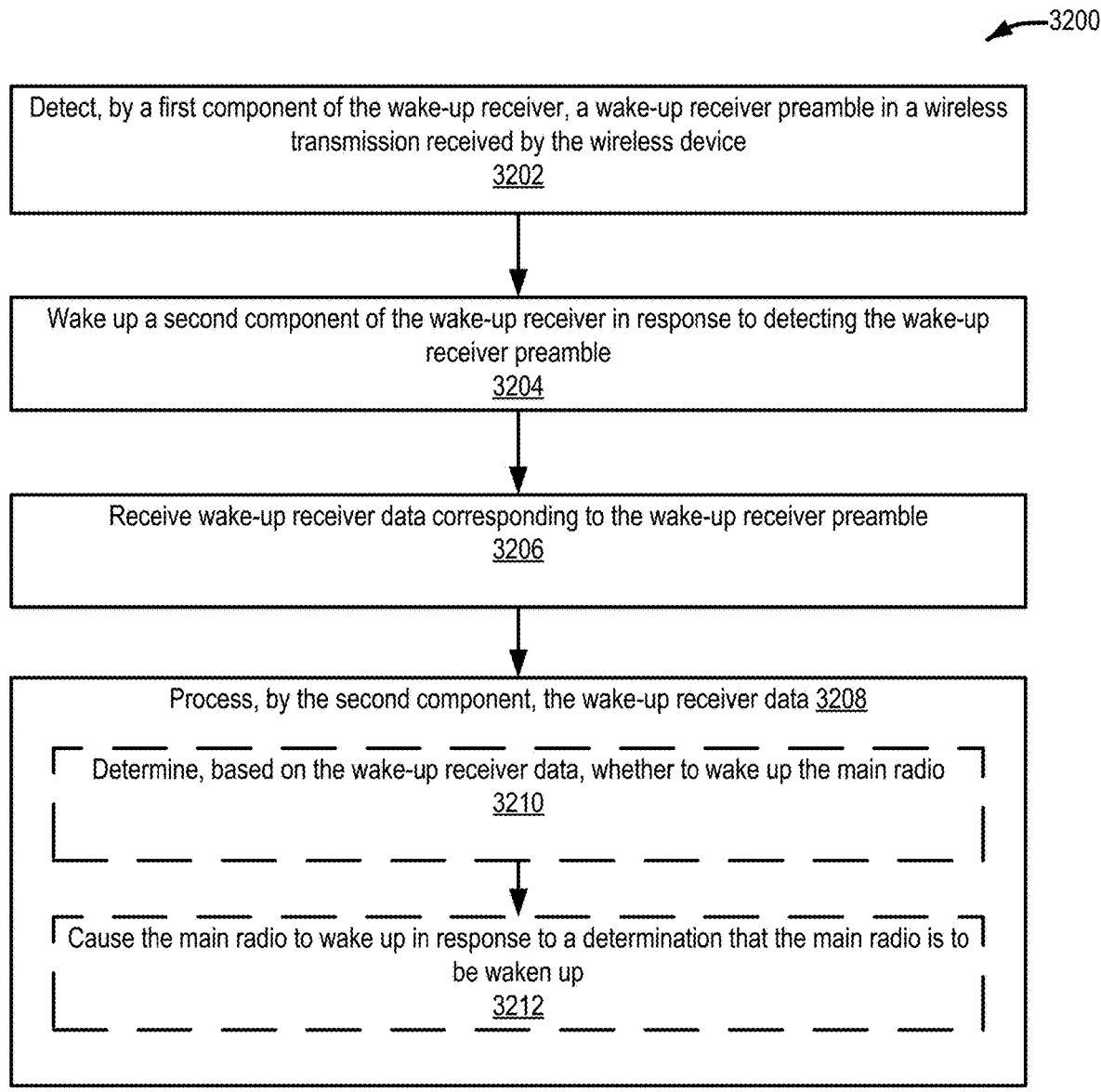
FIG. 32 is a diagram showing a method for detecting and processing a wake-up receiver PPDU, according to some embodiments.

Turning now to FIG. 32, a method 3200 will now be described for detecting and processing a wake-up receiver PPDU, in accordance with some embodiments. The method 3200 may be performed by one or more devices described herein. For example, the method 3200 may be performed by a wireless device 104 functioning as non-AP STA in a wireless network that includes a main radio and a wake-up receiver.

Although shown in a particular order, in some embodiments the operations of the method 3200 (and the other methods shown in the other figures) may be performed in a different order. For example, although the operations of the method 3200 are shown in a sequential order, some of the operations may be performed in partially or entirely overlapping time periods.

As shown in FIG. 32, the method 3200 may commence at operation 3202 with a first component (e.g., preamble detector) of the wake-up receiver detecting a wake-up receiver preamble in a wireless transmission received by the wireless device.

At operation 3204, the wireless device wakes up a second component (e.g., wake-up receiver processor) of the wake-up receiver in response to detecting the wake-up receiver preamble.

At operation 3206, the wireless device receives wake-up receiver data corresponding to the wake-up receiver preamble.

At operation 3208, the second component processes the processes the wake-up receiver data. This processing may involve operation 3210 and operation 3212. At operation 3210, the second component determines, based on the wake-up receiver data, whether to wake up the main radio. At operation 3212, the second component causes the main radio to be woken up in response to a determination that the main radio is to be woken up.

Figure 33:
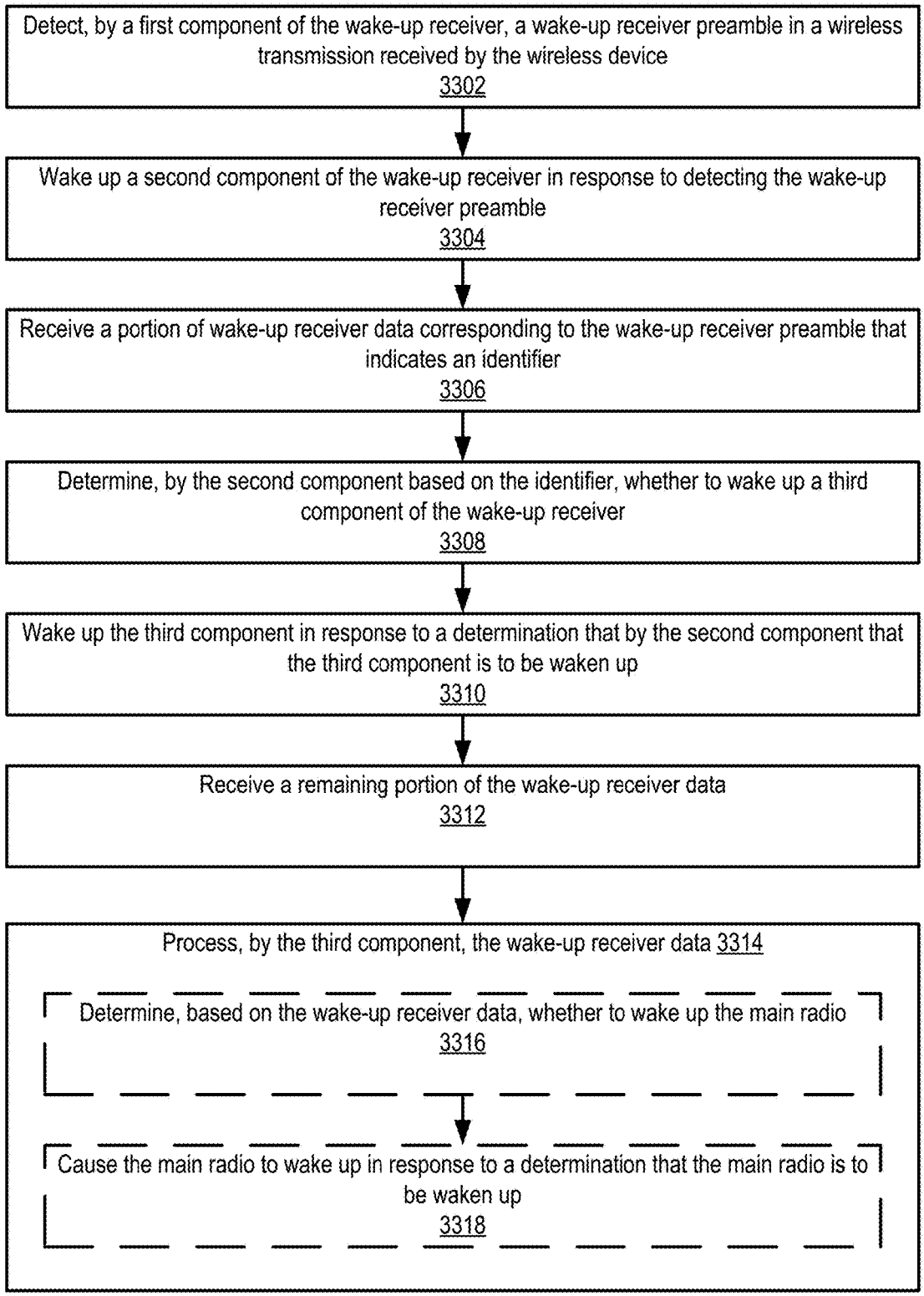
FIG. 33 is a diagram showing another method for detecting and processing a wake-up receiver PPDU, according to some embodiments.

Turning now to FIG. 33, another method 3300 will now be described for detecting and processing a wake-up receiver PPDU, in accordance with some embodiments. The method 3300 may be performed by one or more devices described herein. For example, the method 3300 may be performed by a wireless device 104 functioning as a non-AP STA in a wireless network that includes a main radio and a wake-up receiver.

As shown in FIG. 33, the method 3300 may commence at operation 3302 with a first component (e.g., preamble detector) of the wake-up receiver detecting a wake-up receiver preamble in a wireless transmission received by the wireless device.

At operation 3304, the wireless device wakes up a second component (e.g., ID matcher) of the wake-up receiver in response to detecting the wake-up receiver preamble.

At operation 3306, the wireless device receives a portion of wake-up receiver data corresponding to the wake-up receiver preamble that includes an identifier.

At operation 3308, the second component determines, based on the identifier, whether to wake up a third component of the wake-up receiver.

At operation 3310, the wireless device wakes up the third component (e.g., wake-up receiver processor) in response to a determination by the second component that the third component is to be woken up.

At operation 3312, the wireless device receives a remaining portion of the wake-up receiver data.

At operation 3314, the third component processes the wake-up receiver data. This processing may involve operation 3316 and operation 3318. At operation 3316, the third component determines, based on the wake-up receiver data, whether to wake up the main radio. At operation 3318, the third component causes the main radio to be woken up in response to a determination that the main radio is to be woken up.

In an embodiment, the wireless device remains in a first mode or transitions to a second mode in response to a determination by the second component that the third component is not to be woken up, wherein the first mode is a mode in which the first component is in an awake mode but the second component and the third component are in a sleep mode, wherein the second mode is a mode in which the first component, the second component, and the third component are in a sleep mode.

In an embodiment, the wake-up receiver data includes a MAC header, wherein the MAC header includes an identifier field that is used to indicate the identifier. In an embodiment, the identifier field includes a mode subfield and an identifier subfield, wherein the mode subfield is used to indicate a type of the identifier indicated in the identifier subfield. In an embodiment, the mode subfield is used to indicate whether the type of the identifier is a reduced identifier or a full identifier. In an embodiment, the mode subfield is used to indicate whether the type of the identifier is a group ID, a transmitting AP ID, a nontransmitted BSSID ID, or a WUR ID.

Figure 34:
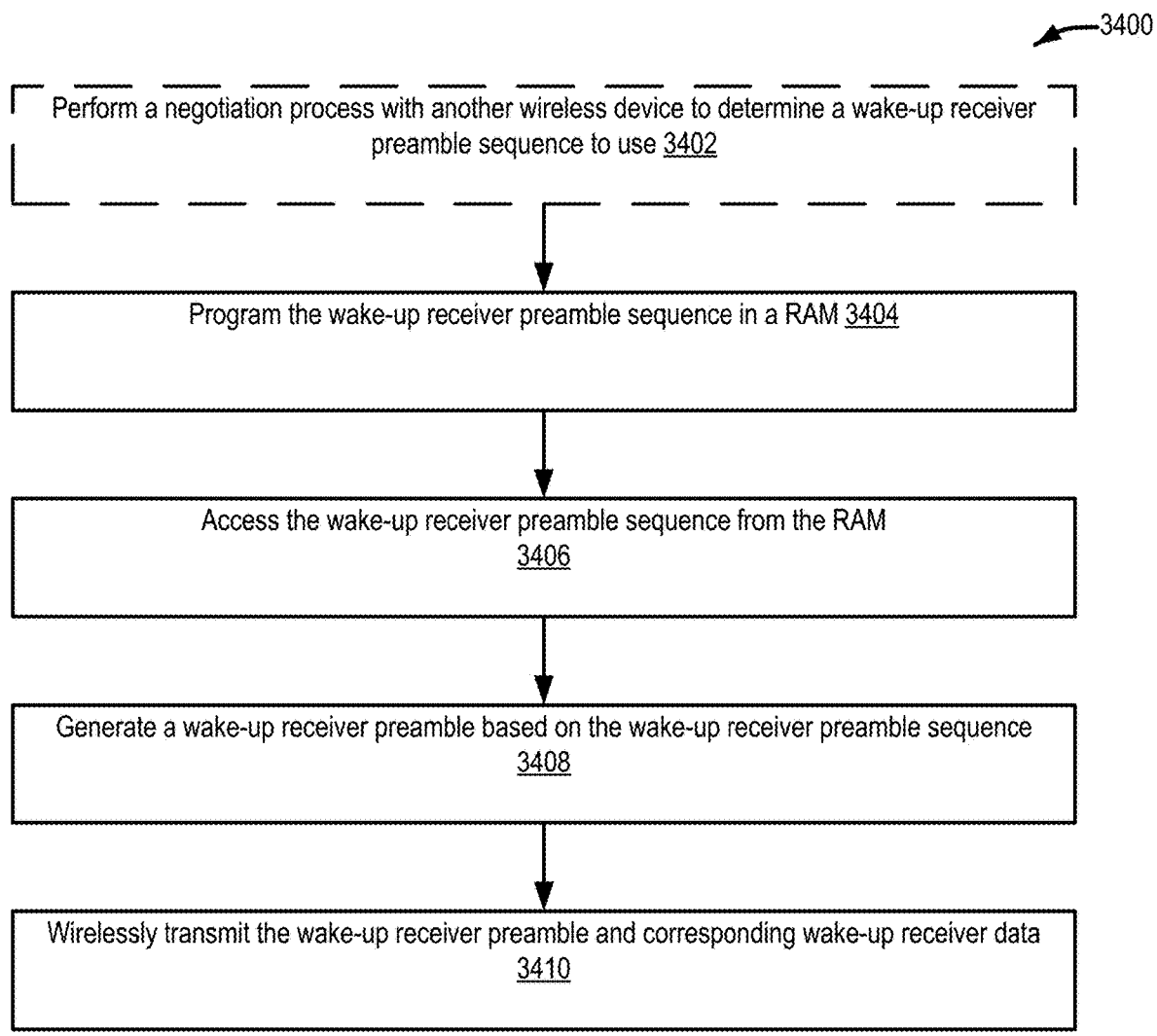
FIG. 34 is a diagram showing a method for generating and transmitting a wake-up receiver preamble using a programmable wake-up receiver preamble sequence, according to some embodiments.

Turning now to FIG. 34, a method 3400 will now be described for generating and transmitting a wake-up receiver preamble using a programmable wake-up receiver preamble sequence, in accordance with some embodiments. The method 3400 may be performed by one or more devices described herein. For example, the method 3400 may be performed by a wireless device 104 functioning as an AP STA in a wireless network.

As shown in FIG. 34, in an embodiment, the method 3400 commences at operation 3402 with the wireless device performing a negotiation process with another wireless device to determine a wake-up receiver preamble sequence to use.

At operation 3404, the wireless device programs the wake-up receiver preamble sequence in a RAM. In an embodiment, the wake-up receiver preamble sequence is one of binary '00110111010010100100111000111010',
binary '11100011000101110010001011011010', and
binary '00011100111010001101110100100101'.

At operation 3406, the wireless device accesses the wake-up receiver preamble sequence from the RAM.

At operation 3408, the wireless device generates a wake-up receiver preamble based on the wake-up receiver preamble sequence.

At operation 3410, the wireless device wirelessly transmits the wake-up receiver preamble and corresponding wake-up receiver data.

The wireless device may program multiple different wake-up receiver preamble sequences in the RAM and use different ones of the wake-up receiver preamble sequences to generate and transmit wake-up receiver preambles. For example, in an embodiment, the wireless device programs a second wake-up receiver preamble sequence in the RAM, generates a second wake-up receiver preamble based on the second wake-up receiver preamble sequence, and wirelessly transmits the second wake-up receiver preamble and corresponding second wake-up receiver data.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device operating in a wireless network, wherein the wireless device includes a main radio and a wake-up receiver, the method comprising:
   detecting, by a first component of the wake-up receiver while the first component is in an awake mode and a second component of the wake-up receiver is in a sleep mode, a wake-up receiver preamble in a wireless transmission received by the wireless device; and
   waking up a second component of the wake-up receiver in response to detecting the wake-up receiver preamble, wherein the second component is operable to process wake-up receiver data corresponding to the wake-up receiver preamble after the first component detects the wake-up receiver preamble.

2. The method of claim 1, further comprising:
   receiving the wake-up receiver data; and
   processing, by the second component, the wake-up receiver data.

3. The method of claim 2, wherein the processing, by the second component, the wake-up receiver data comprises:
   determining, based on the wake-up receiver data, whether to wake up the main radio; and
   causing the main radio to wake up in response to a determination that the main radio is to be woken up.

4. The method of claim 1, further comprising:
   receiving a portion of wake-up receiver data corresponding to the wake-up receiver preamble that indicates an identifier; and
   determining, by the second component based on the identifier, whether to wake up a third component of the wake-up receiver.

5. The method of claim 4, further comprising:
   waking up the third component in response to a determination by the second component that the third component is to be woken up;
   receiving a remaining portion of the wake-up receiver data; and
   processing, by the third component, the wake-up receiver data.

6. The method of claim 5, wherein the processing, by the third component, the wake-up receiver data comprises:
   determining, based on the wake-up receiver data, whether to wake up the main radio; and
   causing the main radio to wake up in response to a determination that the main radio is to be woken up.

7. The method of claim 4, further comprising:
   remaining in a first mode or transitioning to a second mode in response to a determination by the second component that the third component is not to be woken up, wherein the first mode is a mode in which the first component is in an awake mode but the second component and the third component are in a sleep mode, wherein the second mode is a mode in which the first component, the second component, and the third component are in a sleep mode.

8. The method of claim 4, wherein the wake-up receiver data includes a media access control (MAC) header, wherein the MAC header includes an identifier field that is used to indicate the identifier.

9. The method of claim 8, wherein the identifier field includes a mode subfield and an identifier subfield, wherein the mode subfield is used to indicate a type of the identifier indicated in the identifier subfield.

10. The method of claim 9, wherein the mode subfield is used to indicate whether the type of the identifier is a reduced identifier or a full identifier.

11. The method of claim 9, wherein the mode subfield is used to indicate whether the type of the identifier is a group ID, a transmitting access point (AP) ID, a nontransmitted basic service set ID (BSSID) ID, or a wake-up receiver (WUR) ID.

12. A method performed by a wireless device, the method comprising:
    programming a wake-up receiver preamble sequence in a random access memory (RAM), wherein the programming replaces a previous wake-up receiver preamble sequence that was stored in the RAM;
    accessing the wake-up receiver preamble sequence from the RAM;
    generating a wake-up receiver preamble based on the wake-up receiver preamble sequence; and
    wirelessly transmitting the wake-up receiver preamble and corresponding wake-up receiver data.

13. The method of claim 12, wherein the wake-up receiver preamble sequence is one of binary '00110111010010100100111000111010', binary '11100011000101110010001011011010', and binary '00011100111010001101110100100101'.

14. The method of claim 12, further comprising:
    performing a negotiation process with another wireless device to determine the wake-up receiver preamble sequence.

15. The method of claim 12, further comprising:
    programming a second wake-up receiver preamble sequence in the RAM;
    generating a second wake-up receiver preamble based on the second wake-up receiver preamble sequence; and
    wirelessly transmitting the second wake-up receiver preamble and corresponding second wake-up receiver data.

16. A wireless device that is to operate in a wireless network, the wireless device comprising:
    a main radio;
    a wake-up receiver;
    a memory device storing a set of instructions; and
    a processor coupled to the memory device, wherein the set of instructions when executed by the processor causes the wireless device to:
    detect, using a first component of the wake-up receiver while the first component is in an awake mode and a second component of the wake-up receiver is in a sleep mode, a wake-up receiver preamble in a wireless transmission received by the wireless device and
    wake up a second component of the wake-up receiver in response to detecting the wake-up receiver preamble, wherein the second component is operable to process wake-up receiver data corresponding to the wake-up receiver preamble after the first component detects the wake-up receiver preamble.

17. The wireless device of claim 16, wherein the set of instructions when executed by the processor further causes the wireless device to:
    receive the wake-up receiver data and
    process, using the second component, the wake-up receiver data.

18. The wireless device of claim 17, wherein the set of instructions when executed by the processor further causes the wireless device to:
    determine, based on the wake-up receiver data, whether to wake up the main radio and
    causing the main radio to wake up in response to a determination that the main radio is to be woken up.

19. A wireless device that is to operate in a wireless network, the wireless device comprising:
- a main radio;
- a wake-up receiver;
- a memory device storing a set of instructions; and
- a processor coupled to the memory device, wherein the set of instructions when executed by the processor causes the wireless device to:
  - program a wake-up receiver preamble sequence in a random access memory (RAM), wherein the programming replaces a previous wake-up receiver preamble sequence that was stored in the RAM,
  - access the wake-up receiver preamble sequence from the RAM,
  - generate a wake-up receiver preamble based on the wake-up receiver preamble sequence, and
  - wirelessly transmit the wake-up receiver preamble and corresponding wake-up receiver data.

20. The wireless device of claim 19, wherein the wake-up receiver preamble sequence is one of binary '0011011101001010010011000111010', binary '11100011000101110010001011011010', and binary '000111001110100011011101001000101'.

* * * * *